United States Patent
Chiba

(10) Patent No.: US 9,900,674 B2
(45) Date of Patent: Feb. 20, 2018

(54) ELECTRONIC DEVICE, CONTROL METHOD, AND CONTROL PROGRAM

(71) Applicant: KYOCERA Corporation, Kyoto-shi, Kyoto (JP)

(72) Inventor: Atsuo Chiba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/424,343

(22) PCT Filed: Aug. 28, 2013

(86) PCT No.: PCT/JP2013/072997
§ 371 (c)(1),
(2) Date: Feb. 26, 2015

(87) PCT Pub. No.: WO2014/034718
PCT Pub. Date: Mar. 6, 2014

(65) Prior Publication Data
US 2015/0245117 A1      Aug. 27, 2015

(30) Foreign Application Priority Data

Aug. 28, 2012   (JP) .................................. 2012-188021

(51) Int. Cl.
*H04R 1/00*       (2006.01)
*H04M 1/725*    (2006.01)
*G08B 3/00*      (2006.01)

(52) U.S. Cl.
CPC ................ *H04R 1/00* (2013.01); *G08B 3/00* (2013.01); *H04M 1/72566* (2013.01); *H04R 2499/11* (2013.01)

(58) Field of Classification Search
CPC ....................... H04R 2499/11; H04R 2400/03
USPC ............... 381/150, 388, 306, 333; 455/414.3
See application file for complete search history.

(56) References Cited

U.S. PATENT DOCUMENTS

| 8,600,457 | B2* | 12/2013 | Vargas | H04W 52/0258 455/412.2 |
| 2009/0143114 | A1* | 6/2009 | Vargas | H04W 52/0258 455/574 |
| 2009/0186604 | A1* | 7/2009 | Ruy | G06Q 10/10 455/414.3 |
| 2010/0030612 | A1* | 2/2010 | Kim | G01C 21/362 705/7.18 |

FOREIGN PATENT DOCUMENTS

| JP | 2-131698 U | 11/1990 |
| JP | 2001-101144 A | 4/2001 |
| JP | 2011-047734 A | 3/2011 |
| WO | 2009/070601 A1 | 6/2009 |

OTHER PUBLICATIONS

International Search Report dated Sep. 24, 2013 in corresponding International Application No. PCT/JP2013/072997.
Office Action in JP Patent Application No. 2012-188021, dated May 17, 2016, for which an explanation of relevance is attached.

* cited by examiner

*Primary Examiner* — Sunita Joshi
(74) *Attorney, Agent, or Firm* — Hauptman Ham, LLP

(57) ABSTRACT

According to one of aspects, an electronic device includes a speaker and a controller. The controller is configured to acquire information and output an acquired information from the speaker upon sounding an alarm.

16 Claims, 20 Drawing Sheets

ELECTRONIC DEVICE, CONTROL METHOD, AND CONTROL PROGRAM

CROSS-REFERENCE TO RELATED APPLICATION

This application is a National Stage of PCT international application Ser. No. PCT/JP2013/072997 filed on Aug. 28, 2013 which designates the United States, incorporated herein by reference, and which is based upon and claims the benefit of priority from Japanese Patent Application No. 2012-188021 filed on Aug. 28, 2012, the entire contents of which are incorporated herein by reference.

FIELD

The present application relates to an electronic device, a control method, and a control program.

BACKGROUND

Some electronic devices such as a mobile phone or a smartphone having a function of sounding an alarm include those that provide the user with various pieces of information in conjunction with the sounding of an alarm.

For example, Patent Literature 1 discloses a mobile phone that outputs news, weather forecast, traffic information, and the like as well as information for time elapsed until an alarm is stopped. Patent Literature 2 discloses one that provides the user with custom data set by a user when a set time to sound an alarm arrives. News, traffic, weather, sports, email, stock information, and the like are exemplified as the custom data.

CITATION LIST

Patent Literature

Patent Literature 1: JP-A-2011-47734
Patent Literature 2: WO2009/070601 (JP-T-2011-509541)

Technical Problem

When a user of an electronic device or the like such as a mobile phone or a smartphone is provided with various pieces of information in conjunction with sounding of an alarm, it is desirable to provide the user with information as new as possible.

For the foregoing reasons, there is a need for an electronic device, a control method, and a control program that provides the user with information as new as possible in conjunction with sounding of an alarm.

SUMMARY

According to one of aspects, an electronic device includes: a speaker; and a controller configured to acquire information and output an acquired information from the speaker upon sounding an alarm.

According to another aspect, a control method is for controlling an electronic device including a speaker. The control method includes: acquiring information upon sounding an alarm; and outputting an acquired information from the speaker.

According to another aspect, a control program causes an electronic device including a speaker to execute: acquiring information upon sounding an alarm; and outputting an acquired information from the speaker.

DESCRIPTION OF EMBODIMENTS

Exemplary embodiments for implementing the electronic device, the control method, and the control program according to the present application will be explained in detail below with reference to the accompanying drawings. A smartphone will be explained below as one of examples of the electronic device.

First Embodiment

Figure 1:
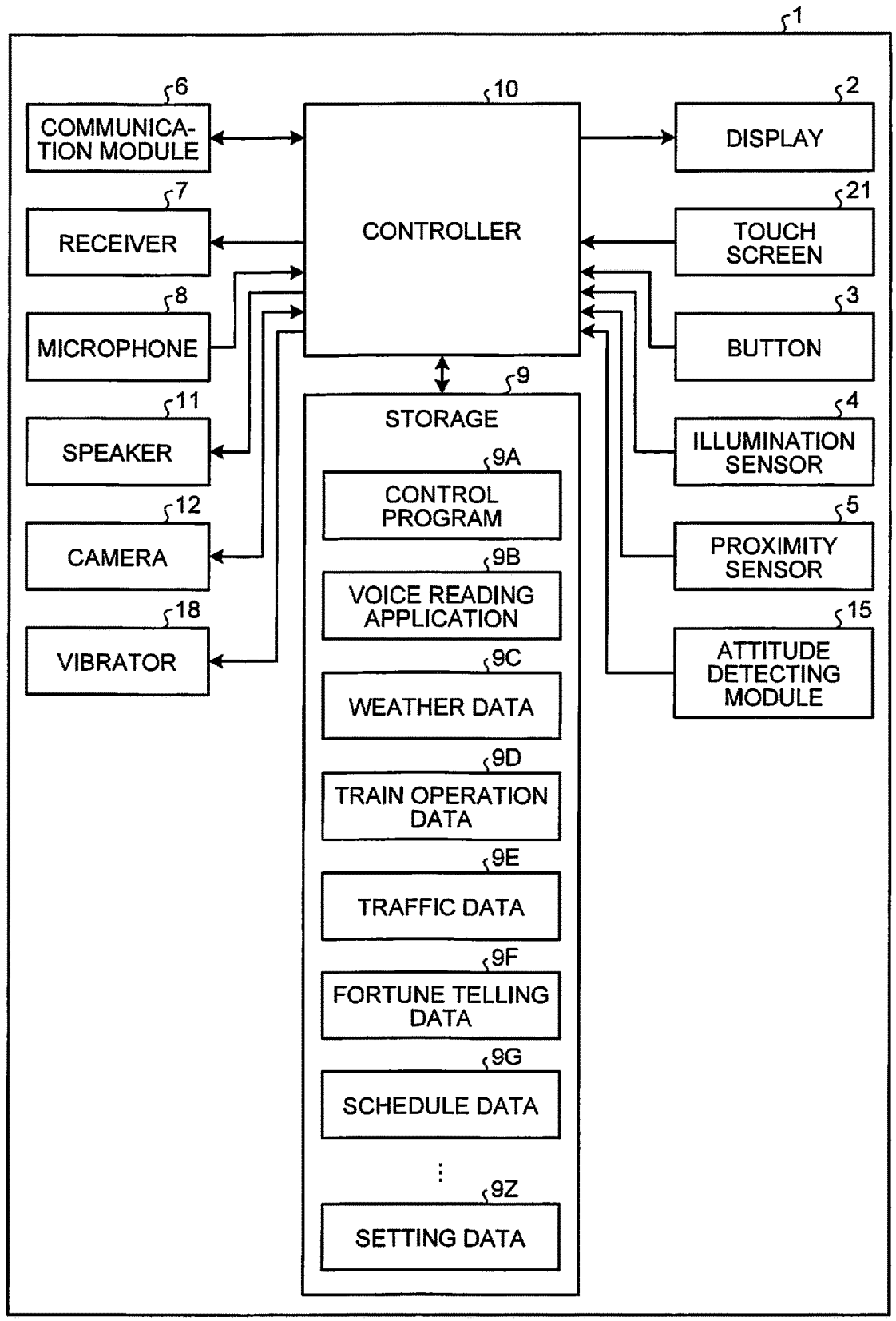
FIG. 1 is a block diagram of a smartphone according to a first embodiment.

A functional configuration of a smartphone 1 according to a first embodiment will be explained with reference to FIG. 1. FIG. 1 is a block diagram of the smartphone according to the first embodiment. As illustrated in FIG. 1, the smartphone 1 includes a display 2, a button 3, an illumination sensor 4, a proximity sensor 5, a communication module 6, a microphone 8, a storage 9, a controller 10, a speaker 11, a camera 12, an attitude detecting module 15, a vibrator 18, and a touch screen 21.

The display 2 includes a display device such as an LCD (Liquid Crystal Display), an OELD (Organic Electro-Luminescence Display), or an IELD (Inorganic Electro-Luminescence Display). The display 2 displays text, images, symbols, graphics, and the like.

The button 3 receives an operation input from a user. The number of the button 3 may be single or plural.

The illumination sensor 4 detects illumination of the ambient light of the smartphone 1. The illumination indicates intensity of light, lightness, or brightness. The illumination sensor 4 is used, for example, to adjust the brightness of the display 2.

The proximity sensor 5 detects the presence of a nearby object without any physical contact. The proximity sensor 5 detects the presence of the object based on changes in a magnetic field or changes in a return time of a reflected wave of an ultrasonic wave, etc. The proximity sensor 5 detects that, for example, the display 2 is brought close to someone's face. The illumination sensor 4 and the proximity sensor 5 may be configured as one sensor. The illumination sensor 4 may be used as the proximity sensor.

The communication module 6 performs communication by radio waves. A communication system supported by the communication module 6 comprises wireless communication standard. Examples of the wireless communication standard include, but are not limited to, a communication standard of cellar phones such as 2G, 3G, and 4G. Examples of the communication standard of the cellar phones include, but are not limited to, LTE (Long Term Evolution), W-CDMA (Wideband Code Division Multiple Access), CDMA 2000, PDC (Personal Digital Cellular), GSM (Global System for Mobile Communications), and PHS (Personal Handy-phone System). Examples of the wireless communication standard further include, but are not limited to, WiMAX (Worldwide Interoperability for Microwave Access), IEEE 802.11, Bluetooth, IrDA (Infrared Data Association), NFC (Near Field Communication), and WPAN (Wireless Personal Area Network). The communication module 6 may support one or more of the communication standards.

The receiver 7 includes a sound output module. The receiver 7 outputs a sound signal transmitted from the controller 10 as a sound. The receiver 7 is used, for example, to output a voice of a call partner on the phone. The microphone 8 includes a sound input module. The microphone 8 converts the voice of the user or the like to a sound signal and transmits the converted signal to the controller 10.

The storage 9 stores therein programs and data. The storage 9 is used also as a work area for temporarily storing a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disc, or a magneto-optical disc with a reader of the storage medium. The storage 9 may include a storage device used as a temporary storage area such as RAM (Random Access Memory).

The program stored in the storage 9 includes applications each executed in the foreground or in the background and a control program for assisting operations of the applications. The application causes the controller 10, for example, to display a screen on the display 2 and to perform processing according to a gesture detected by the touch screen 21. The control program is, for example, an OS. The applications and the control program may be installed in the storage 9 through wireless communication by the communication module 6 or through a non-transitory storage medium. Examples of the non-transitory storage medium include, but are not limited to, an optical disc such as CD, DVD, and Blu-ray, a magneto-optical disc, a magnetic storage medium, a memory card, and solid-state storage medium.

The storage 9 stores therein, for example, a control program 9A, a voice reading application 9B, weather data 9C, train operation data 9D, traffic data 9E, fortune telling data 9F, schedule data 9G, and setting data 9Z.

The control program 9A provides a function related to various controls for operating the smartphone 1. The control program 9A includes, for example, a function of providing an interface for settings related to sounding of an alarm. The control program 9A provides, for example, a function of outputting an alarm sound from the speaker 11 when it reaches the time at which the alarm is sounded. The control program 9A provides, for example, a function of displaying a screen representing that the alarm is sounding on the display 2.

Furthermore, the control program 9A includes a function of providing an interface for settings related to information to be output from the speaker 11 with a reading voice when the alarm is sounded. The control program 9A includes a function of acquiring various data by automatically synchronizing data between the smartphone 1 and servers that provide the weather data 9C, the train operation data 9D, the traffic data 9E, the fortune telling data 9F, the schedule data 9G, and the like when the alarm is sounded, and of outputting a reading voice corresponding to the acquired data from the speaker 11. Moreover, the control program 9A includes a function of displaying the details of the acquired information in a predetermined notification region. For example, a region on an idle screen where an antenna pict, a remaining battery level, and the like are displayed, or so-called a notification area (also called a notification drawer or a notification center) is used for the notification region.

The control program 9A can also implement phone conversation by controlling, for example, the communication module 6 and the microphone 8. In the control program 9A, for example, a function provided by the control program 9A can be used in combination with a function provided by other program stored in the storage 9.

The voice reading application 9B provides a function of reading information, with a voice corresponding thereto, such as the weather data 9C, the train operation data 9D, the traffic data 9E, the fortune telling data 9F, or the schedule data 9G.

The weather data 9C comprises data acquired from a server of a company that operates a service providing information related to weather. The train operation data 9D comprises data acquired from a server of a company that operates a service providing information related to train operation. The traffic data 9E comprises data acquired from a server of a company that operates a service providing information related to road traffic. The fortune telling data 9F comprises data acquired from a server of a company that operates a service providing information related to fortune telling. The schedule data 9G comprises data for schedule of an individual user acquired from a server of a company that provides a schedule management service. The schedule data 9G is managed individually by an account assigned to each user by the company that provides the schedule management service. The user logs in to a Web site of the company that provides the schedule management service using his/her account and registers user's own schedule therein in advance.

The setting data 9Z includes information for various settings and processing related to operations of the smartphone 1. The setting data 9Z includes the user's setting data related to sounding of an alarm. The setting data 9Z includes data for various alarm sounds. The setting data 9Z includes read-aloud setting data that is set in advance as information to be output from the speaker 11 with a reading voice when the alarm is sounded. The read-aloud setting data is set by operating a read-aloud setting screen 50 which is explained below. The user can select and set, for example, weather information, operation information of trains, traffic information of roads, fortune telling, schedule, and the like as information to be output from the speaker 11 when the alarm is sounded, in advance through a predetermined interface.

The storage 9 may store applications that provide the weather data 9C, the train operation data 9D, the traffic data 9E, the fortune telling data 9F, the schedule data 9G, and the like to the user. In this case, the control program 9A acquires the weather data 9C, the train operation data 9D, the traffic data 9E, the fortune telling data 9F, the schedule data 9G, and the like acquired by the respective applications synchronizing data between the smartphone 1 and the corresponding servers.

FIG. 1 exemplarily depicts the applications stored in the storage 9. For example, a phone call application, a mail application, a browser application, a navigate application, a music player application, a calculator application, and the like may further be stored in the storage 9.

The controller 10 includes a processing module. Examples of the processing module include, but are not limited to, a CPU (Central Processing Unit), an SoC (System-on-a-chip), an MCU (Micro Control Unit), and an FPGA (Field-Programmable Gate Array). The controller 10 integrally controls the operations of the smartphone 1 to implement various functions.

Specifically, the controller 10 executes instructions included in a program stored in the storage 9 while referring to data stored in the storage 9 as necessary. The controller 10 then controls function modules according to the data and the instructions to thereby implement the various functions. Examples of the function modules include, but are not limited to, the display 2, the communication module 6, the microphone 8, and the speaker 11. The controller 10 can change the control according to a detection result of a detector. Examples of the detector include, but are not limited to, the button 3, the illumination sensor 4, the proximity sensor 5, the receiver 7, the camera 12, the attitude detecting module 15, and the touch screen 21.

The controller 10 executes the control program 9A to perform various controls. For example, when sounding an alarm, the controller 10 acquires information and outputs the acquired information from the speaker 11. For example, when it reaches 5 minutes before a sounding start time of the alarm, the controller 10 refers to the read-aloud setting data included in the setting data 9Z, and acquires the information, which is selected in advance by the user as information to be output from the speaker 11 as a reading voice, from each of Web sites. For example, when the information selected in advance by the user as information to be output as a reading voice are the weather information, the operation information of trains, the traffic information of roads, and the information of fortune telling, the controller 10 acquires respective pieces of information from the Web sites of companies that provide the pieces of information. When the sounding start time of the alarm arrives, the controller 10 outputs an alarm sound according to the setting performed in advance by the user from the speaker 11. The controller 10 sometimes drives the vibrator 18 as well as the alarm sound depending on the setting performed in advance by the user. When the output of the alarm sound is finished, the controller 10 outputs a reading voice for reading the acquired pieces of information aloud. The controller 10 outputs the reading voice for reading aloud, for example, the weather information, the operation information of trains, the traffic information of roads, and the information of fortune telling.

Moreover, the controller 10 displays a notification for the details of the reading voice in the notification region. The controller 10 may perform a display in a stepwise manner such that only an item of the information is first displayed in the notification region and then, when the item is selected by the user, details of the information are displayed. For example, a region on the idle screen where an antenna pict, a remaining battery level, and the like are displayed, or so-called a notification area is used for the notification region.

The speaker 11 includes a sound output module. The speaker 11 outputs a sound signal transmitted from the controller 10 as a sound. The speaker 11 is used to output, for example, a ring tone and music. Either one of the receiver 7 or the speaker 11 may have the other function.

The camera 12 includes an in-camera for photographing an object facing the display 2. The camera 12 converts the photographed image to an electric signal. The smartphone 1 may include an out-camera for photographing an object facing the opposite side of the display 2 in addition to the camera 12.

The attitude detecting module 15 detects an attitude of the smartphone 1. The attitude detecting module 15 includes at least one of an acceleration sensor, a direction sensor, and a gyroscope in order to detect an attitude.

The vibrator 18 vibrates part or whole of the smartphone 1. The vibrator 18 includes, for example, a piezoelectric element or an eccentric motor in order to generate vibration. The vibration generated by the vibrator 18 is used to inform the user of various events such as incoming calls instead of transmitting sound.

The touch screen 21 detects a contact with the touch screen 21. The touch screen 21 is used to detect a contact operation of the user using, for example, a finger, a pen, or a stylus pen. Examples of gestures detected using the touch screen 21 include, but are not limited to, touch, long touch, release, swipe, tap, double tap, long tap, drag, flick, pinch in, and pinch out. The detection method of the touch screen 21 may be any detection method of a capacitive type detection method, a resistive type detection method, a surface acoustic wave type (or ultrasonic type) detection method, an infrared type detection method, an electromagnetic induction type detection method, and a load sensing type detection method.

The functional configuration of the smartphone 1 illustrated is exemplarily illustrated in FIG. 1, and may be modified as required within a scope that does not depart from the gist of the present invention.

Figure 2:
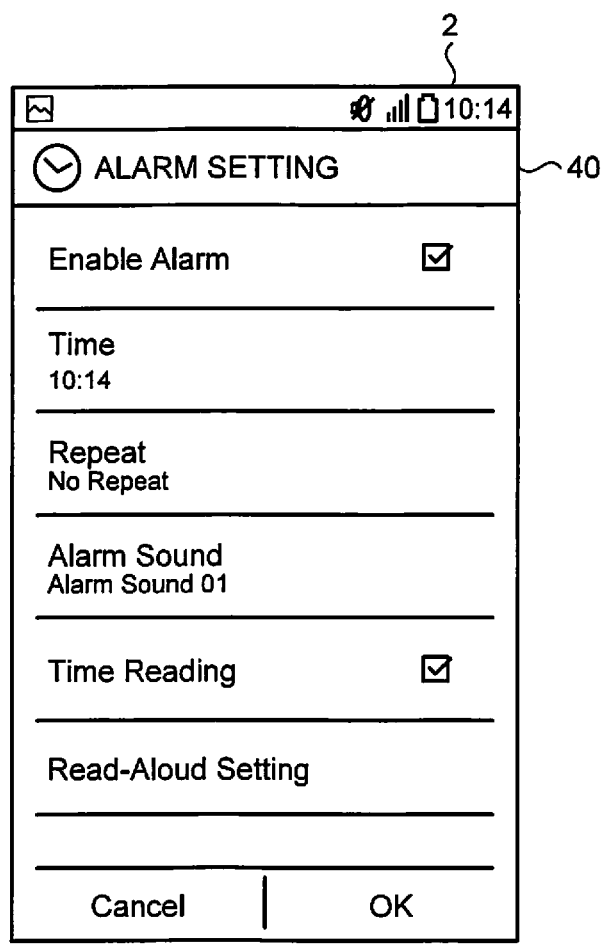
FIG. 2 is a diagram of one of examples of an alarm setting screen which is an interface for settings related to sounding of an alarm.

FIG. 2 is a diagram of one of examples of an alarm setting screen which comprises an interface for settings related to sounding of an alarm. As illustrated in FIG. 2, the controller 10 displays an alarm setting screen 40 for settings related to sounding of an alarm on the display 2. Provided on the alarm setting screen 40 are operating parts used for, for example, enabling/disabling alarm, time setting, repeat, alarm sound, time reading, and read-aloud setting. When the touch screen 21 detects an operation of the user performed on an area indicated as "OK" provided on the alarm setting screen 40, the controller 10 validates the settings on the alarm setting screen 40. On the other hand, when the touch screen 21 detects an operation of the user performed on an area indicated as "Cancel" provided on the alarm setting screen 40, the controller 10 invalidates the settings on the alarm setting screen 40, and maintains the current settings as it is.

Figure 3:
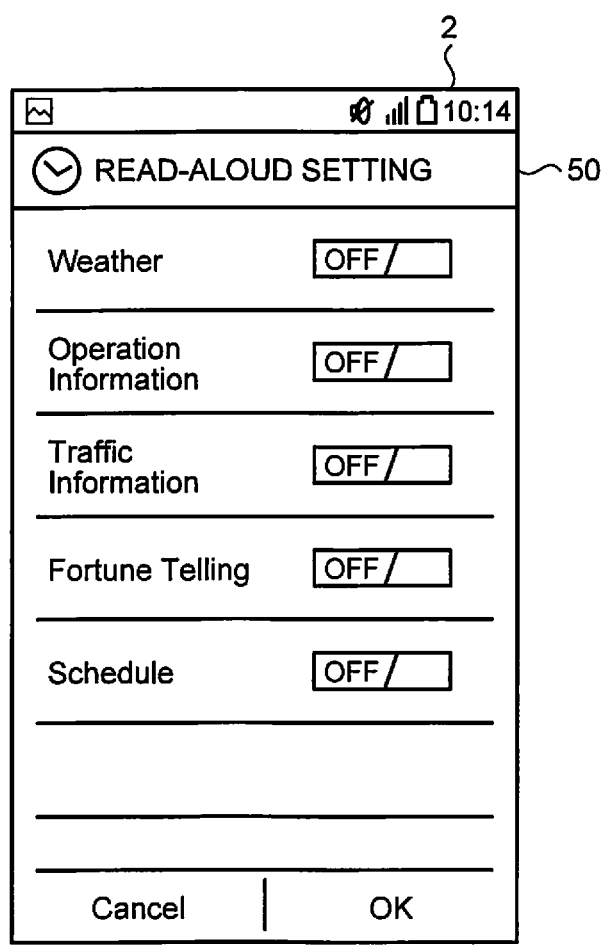
FIG. 3 is a diagram of one of examples of a read-aloud setting screen which is an interface for settings related to information to be output from a speaker with a reading voice.

FIG. 3 is a diagram of one of examples of the read-aloud setting screen which comprises an interface for settings related to information to be output from the speaker 11 with a reading voice. As illustrated in FIG. 3, the controller 10 displays the read-aloud setting screen 50, which comprises an interface for settings related to information to be output from the speaker 11 with a reading voice, on the display 2. Provided on the read-aloud setting screen 50 are operating parts used to perform settings as to whether the information for weather, the operation information, the traffic information, the information for fortune telling, and the information for schedule are output with a reading voice. As illustrated in FIG. 3, when "OFF" is indicated in the operating part corresponding to Weather on the read-aloud setting screen 50, the information for weather is set not to be output with a reading voice. Meanwhile, when "ON" is indicated in the operating part corresponding to Weather on the read-aloud setting screen 50, the information for weather is set to be output with a reading voice. When the touch screen 21 detects an operation of the user performed on the operating part corresponding to Weather on the read-aloud setting screen 50, the controller 10 changes the indication in the operating part corresponding to Weather to "ON" or "OFF" for display. When the touch screen 21 detects an operation of the user performed on the area indicated as "OK" provided on the read-aloud setting screen 50, the controller 10 validates the settings on the read-aloud setting screen 50. On the other hand, when the touch screen 21 detects an operation of the user performed on the area indicated as "Cancel" provided on the read-aloud setting screen 50, the controller 10 invalidates the settings on the read-aloud setting screen 50 and maintains the current setting as it is. The settings for the operation information, the traffic information, the information for fortune telling, and the information for schedule as to whether or not to be output with a reading voice can be set in the same procedure as that of the information for weather.

Examples of control performed by the control program 9A will be explained below with reference to FIG. 4 to FIG. 13.

Figure 4:
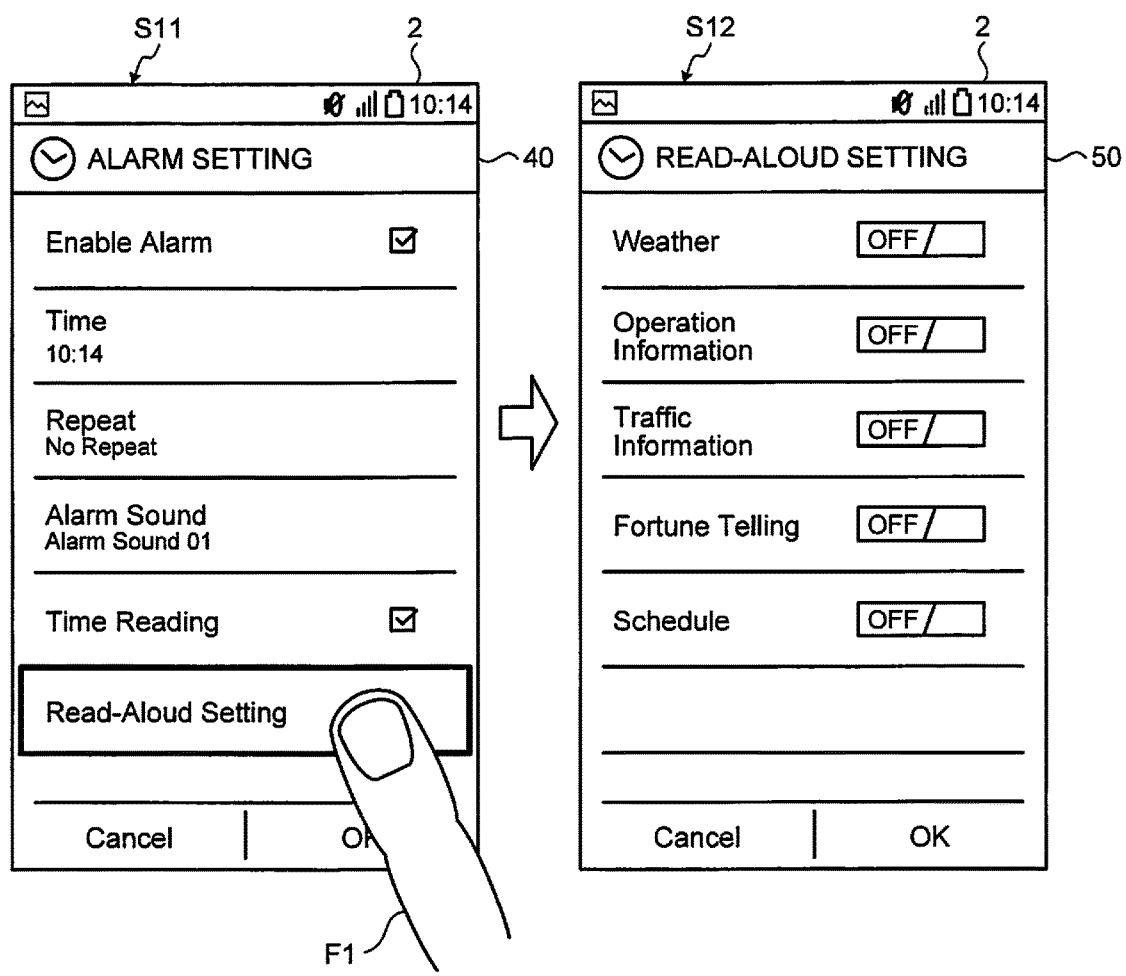
FIG. 4 is a diagram of one of examples of control to display the read-aloud setting screen on a display.

FIG. 4 is a diagram of one of examples of control to display the read-aloud setting screen 50 on the display 2. Step S11 illustrated in FIG. 4 represents a state in which a user's finger F1 is in contact with an area indicated as "Read-Aloud Setting" provided on the alarm setting screen 40. Step S12 illustrated in FIG. 4 represents a state in which the read-aloud setting screen 50 is displayed on the display 2.

As illustrated in FIG. 4, when the touch screen 21 detects an operation of the user performed on the area indicated as "Read-Aloud Setting" provided on the alarm setting screen 40 (Step S11), the smartphone 1 displays the read-aloud setting screen 50 on the display 2 (Step S12).

Figure 5:
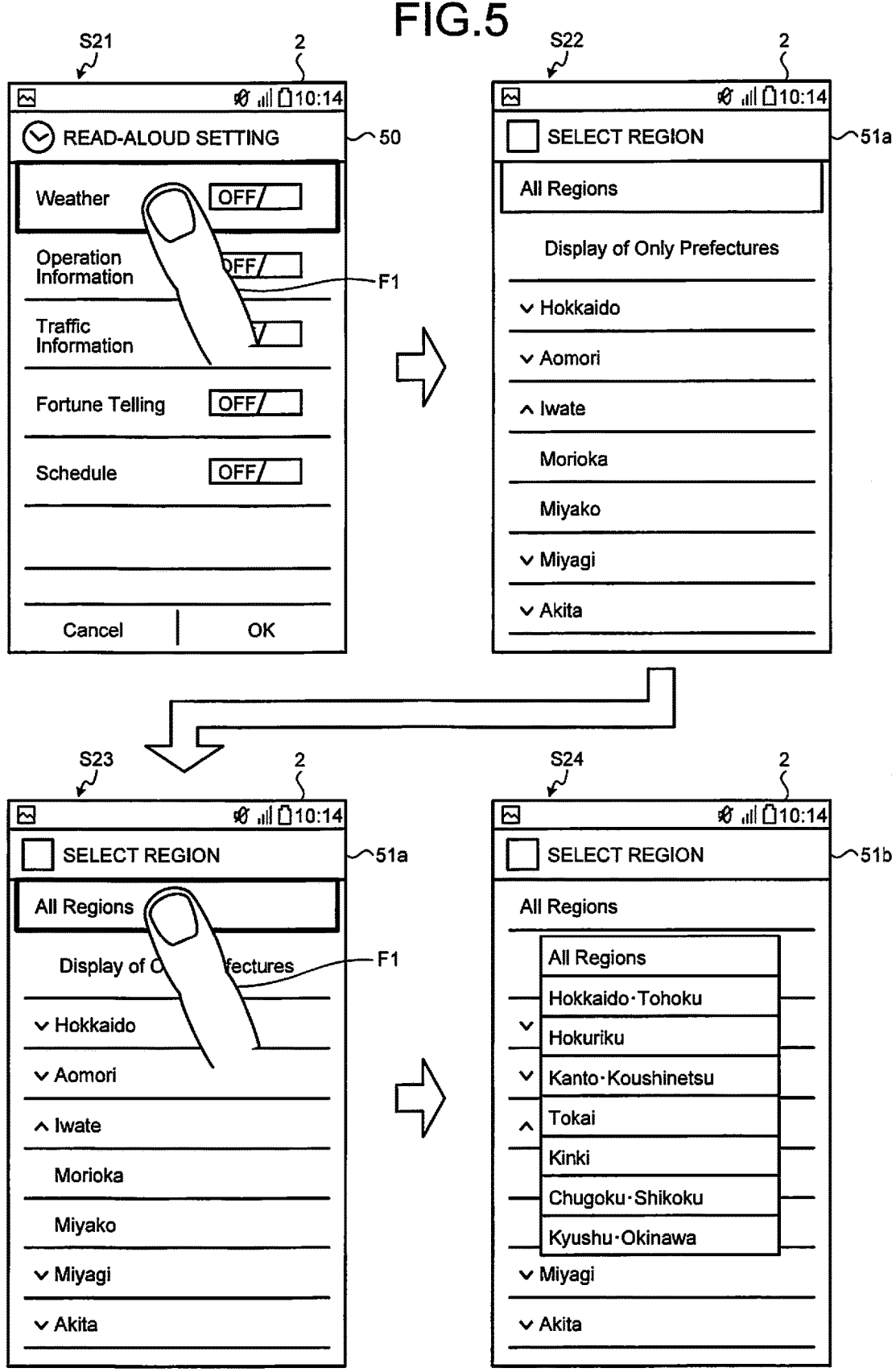
FIG. 5 is a diagram of one of examples of control to display a screen for settings of information for weather on the display.

FIG. 5 is a diagram of one of examples of control to display a screen for settings of information for weather on the display 2. The user can select and set a region whose weather is output with a reading voice, by operating the screen illustrated in FIG. 5.

Step S21 illustrated in FIG. 5 represents a state in which the user's finger F1 is in contact with an area indicated as "Weather" on the read-aloud setting screen 50. Step S22 illustrated in FIG. 5 represents a state in which a screen 51a used to select a region whose weather information is output with a reading voice is displayed. Step S23 illustrated in FIG. 5 represents a state in which the user's finger F1 is in contact with an area indicated as "All Regions" on the screen 51a. Step S24 illustrated in FIG. 5 represents a state of a screen 51b appearing in response to a contact of the user's finger F1 with the area indicated as "All Regions".

As illustrated in FIG. 5, when the touch screen 21 detects an operation of the user performed on the area indicated as "Weather" provided on the read-aloud setting screen 50 (Step S21), the smartphone 1 displays the screen 51a on the display 2 (Step S22). Subsequently, when the touch screen 21 detects an operation of the user performed on the area indicated as "All Regions" provided on the screen 51a (Step S23), the smartphone 1 displays the screen 51b on the display 2 (Step S24).

Figure 6:
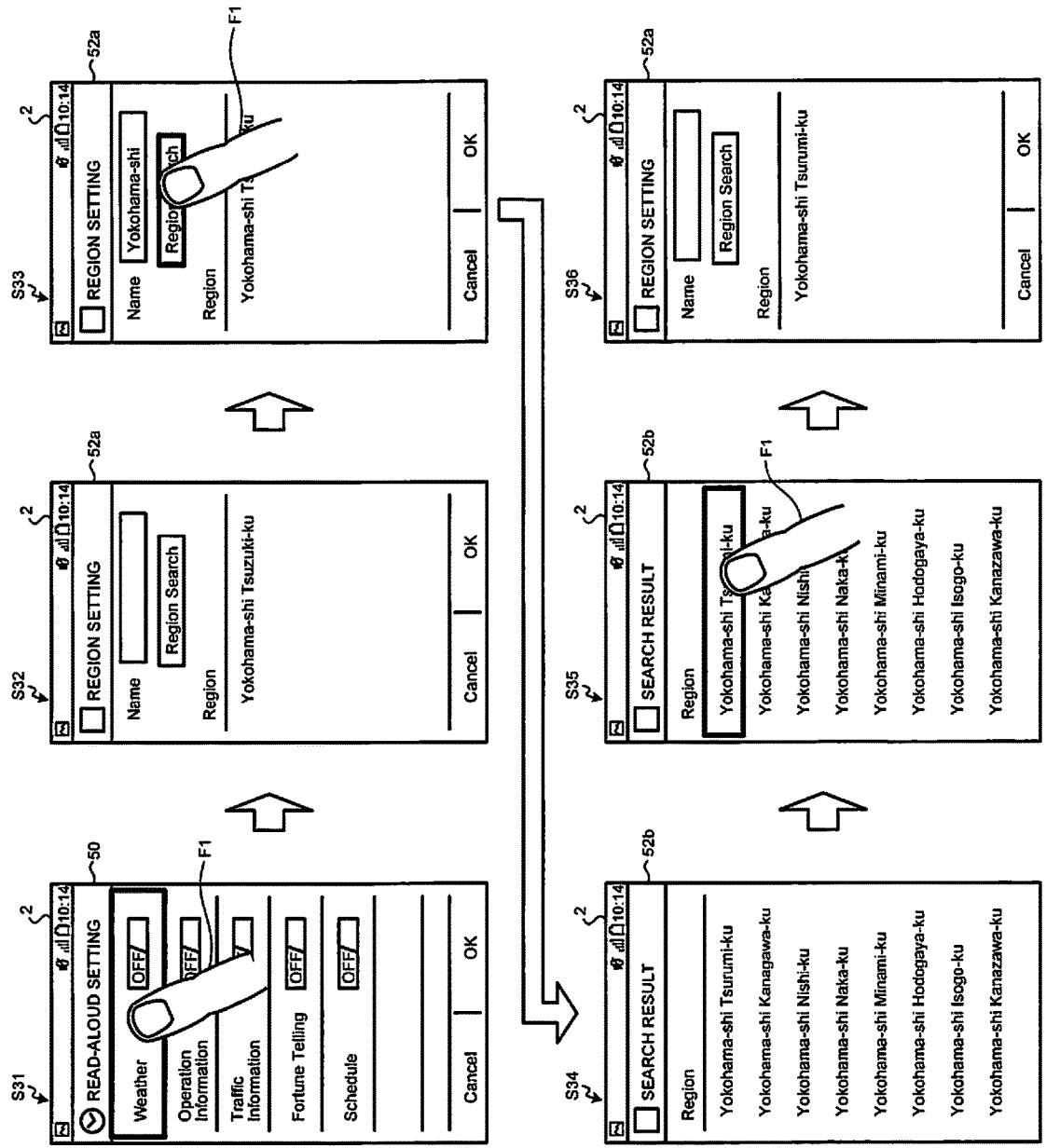
FIG. 6 is a diagram of one of examples of the control to display another screen for settings of the information for weather on the display.

FIG. 6 is a diagram of one of examples of the control to display another screen for settings of the information for weather on the display 2. The user can search for and set a region whose weather is output with a reading voice, by operating the screen illustrated in FIG. 6.

Step S31 illustrated in FIG. 6 represents a state in which the user's finger F1 is in contact with the area indicated as "Weather" on the read-aloud setting screen 50. Step S32 illustrated in FIG. 6 represents a state in which a screen 52a is displayed in order to search for a region whose weather information is output with a reading voice. An input box for inputting a region name being a search target is provided on the screen 52a. A currently set region name (e.g., Yokohama-shi Tsuzuki-ku) appears on the screen 52a. A place-name search button is provided on the screen 52a in order to start a search according to the region name input in the input box as a search target. Step S33 illustrated in FIG. 6 represents a state in which the region name (e.g., Yokohama-shi) as a search target is input in the input box provided on the screen 52a and the user's finger F1 is in contact with the place-name search button provided on the screen 52a. Step S34 illustrated in FIG. 6 represents a state in which a screen 52b including search results according to the region name input in the input box is displayed. Step S35 illustrated in FIG. 6 represents a state in which the user's finger F1 is in contact with an area indicated as "Yokohama-shi Tsurumi-ku" of a list of region name search results displayed on the screen 52*b*. Step S36 illustrated in FIG. 6 represents a state in which the screen 52*a* including the newly set place name (e.g., Yokohama-shi Tsurumi-ku) as a region whose weather information is output with a reading voice is displayed.

As illustrated in FIG. 6, when the touch screen 21 detects an operation of the user performed on the area indicated as "Weather" provided on the read-aloud setting screen 50 (Step S31), the smartphone 1 displays the screen 52*a* used to search for a region whose weather information is output with a reading voice on the display 2 (Step S32). Subsequently, when a region name (e.g., Yokohama-shi) is input in the screen 52*a* and an operation of the user performed on the place-name search button is detected by the touch screen 21 (Step S33), the smartphone 1 displays the screen 52*b*, on the display 2, where search results according to the region name input in the input box are listed (Step S34). Then, when the operation of the user performed on the screen 52*b* is detected by the touch screen 21 (Step S35), the smartphone 1 displays the screen 52*a*, on the display 2, where the region name (e.g., Yokohama-shi Tsurumi-ku) corresponding to the area where the contact of the user's finger F1 is detected is newly set as a region whose weather information is output with a reading voice, from among the list of the search results of the region name (Step S36).

FIG. 6 depicts one of examples (Step S36) in which one region is set as a region whose weather information is output with a reading voice; however, it may be configured that a plurality of regions can be set.

Figure 7:
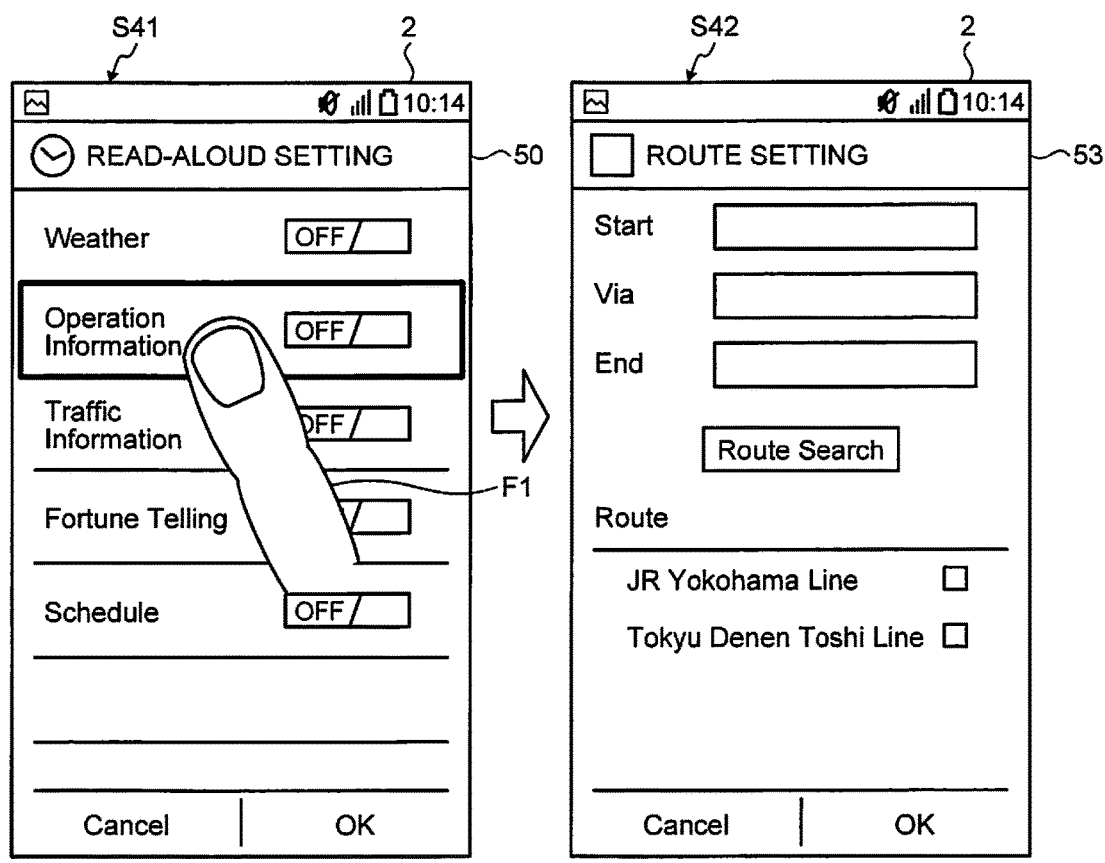
FIG. 7 is a diagram of one of examples of control to display a screen for settings of operation information on the display.

FIG. 7 is a diagram of one of examples of control to display a screen for settings of operation information on the display 2. The user can specify a departure station, a pass-through station, and a destination station, and set a route whose operation information is output with a reading voice, by operating the screen illustrated in FIG. 7.

Step S41 illustrated in FIG. 7 represents a state in which the user's finger F1 is in contact with an area indicated as "Operation Information" on the read-aloud setting screen 50. Step S42 illustrated in FIG. 7 represents a state in which a screen 53 used to search for a route whose operation information is output with a reading voice is displayed on the display 2. Input boxes for inputting the departure station, the pass-through station, and the destination station are provided on the screen 53. Currently set routes (e.g., JR Yokohama Line, and Tokyu Denen Toshi Line) appear on the screen 53. A route search button is provided on the screen 53 in order to start a search of a route according to the departure station, the pass-through station, and the destination station input in the input boxes.

As illustrated in FIG. 7, when the touch screen 21 detects an operation of the user performed on the area indicated as "Operation Information" provided on the read-aloud setting screen 50 (Step S41), the smartphone 1 displays the screen 53 on the display 2 (Step S42).

Figure 8:
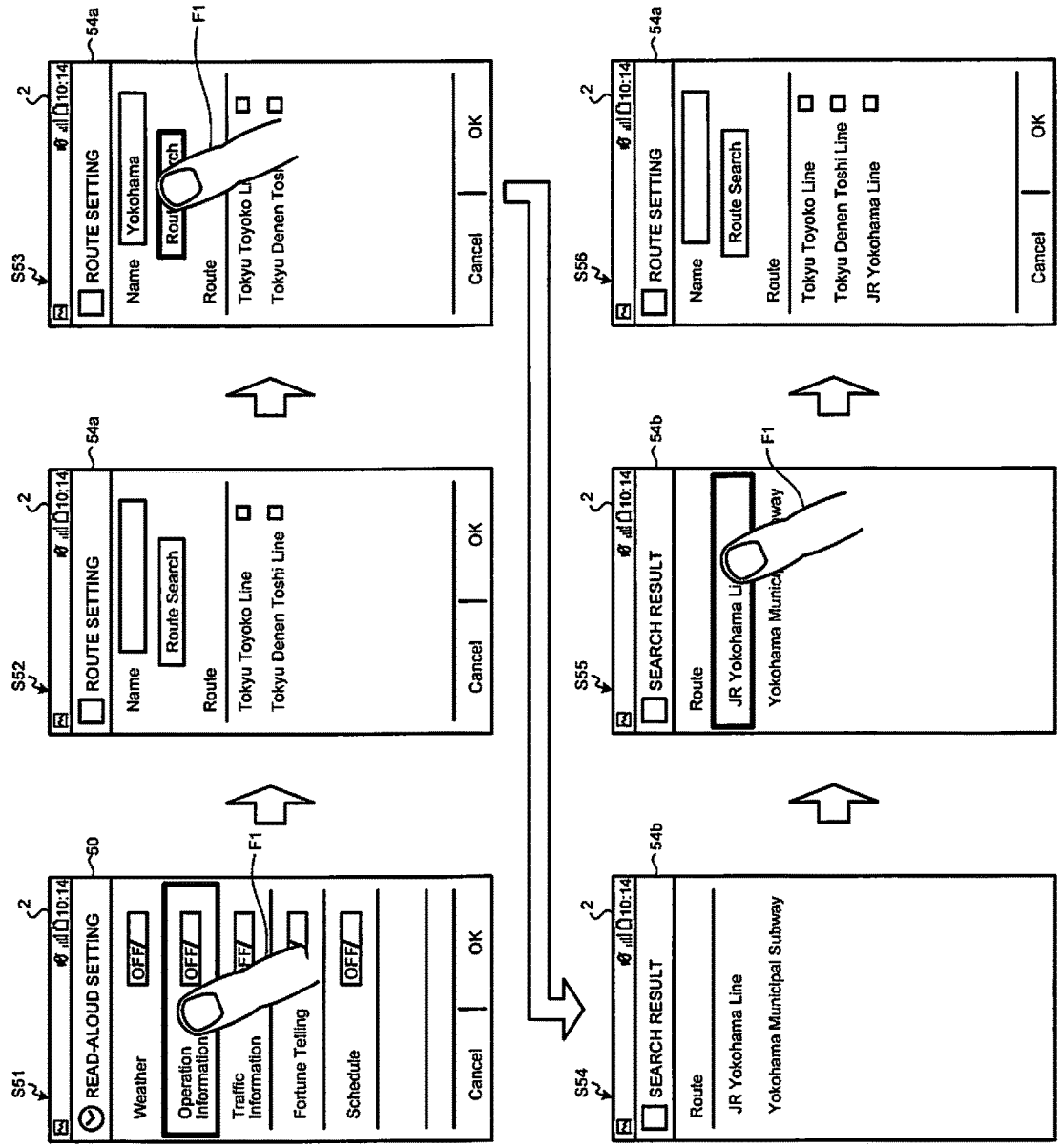
FIG. 8 is a diagram of one of examples of the control to display another screen for settings of the operation information on the display.

FIG. 8 is a diagram of one of examples of the control to display another screen for settings of the operation information on the display 2. The user can directly input characters included in a route name, and set the route information to be output with a reading voice, by operating the screen illustrated in FIG. 8.

Step S51 illustrated in FIG. 8 represents a state in which the user's finger F1 is in contact with the area indicated as "Operation Information" on the read-aloud setting screen 50. Step S52 illustrated in FIG. 8 represents a state in which a screen 54*a* used to search for route name whose operation information is output with a reading voice is displayed. An input box for inputting characters included in the route name is provided on the screen 54*a*. Currently set routes (e.g., Tokyu Toyoko Line, and Tokyu Denen Toshi Line) appear on the screen 54*a*. A route search button is provided on the screen 54*a* in order to start a search of the route including the characters input in the input box. Step S53 illustrated in FIG. 8 represents a state in which the characters (e.g., "Yokohama") included in the route name are input in the input box provided on the screen 54*a* and the user's finger F1 is in contact with the route search button provided on the screen 54*a*. Step S54 illustrated in FIG. 8 represents a state in which a screen 54*b* including search results of the route name including the characters input in the input box is displayed. Step S55 illustrated in FIG. 8 represents a state in which the user's finger F1 is in contact with an area where a route name (e.g., "JR Yokohama Line") is indicated on the screen 54*b*. Step S56 illustrated in FIG. 8 represents a state in which the screen 54*a* including a newly added route name (e.g., "JR Yokohama Line") as a route whose operation information is output with a reading voice is displayed.

As illustrated in FIG. 8, when the touch screen 21 detects an operation of the user performed on the area indicated as "Operation Information" provided on the read-aloud setting screen 50 (Step S51), the smartphone 1 displays the screen 54*a* used to search for a route name whose route information is output with a reading voice on the display 2 (Step S52). Subsequently, when characters (e.g., Yokohama) included in the route name are input in the screen 54*a* and an operation of the user performed on the route search button is detected by the touch screen 21 (Step S53), the smartphone 1 displays the screen 54*b* including search results of the route name including the characters input in the input box on the display 2 (Step S54). Then, when the operation of the user performed on the screen 54*b* is detected by the touch screen 21 (Step S55), the smartphone 1 displays the screen 54*a* where the route name (e.g., JR Yokohama Line) corresponding to the area where the contact of the user's finger F1 is detected is newly added as a route name whose operation information is output with a reading voice on the display 2, from among the list of the search results of the route names (Step S56).

Figure 9:
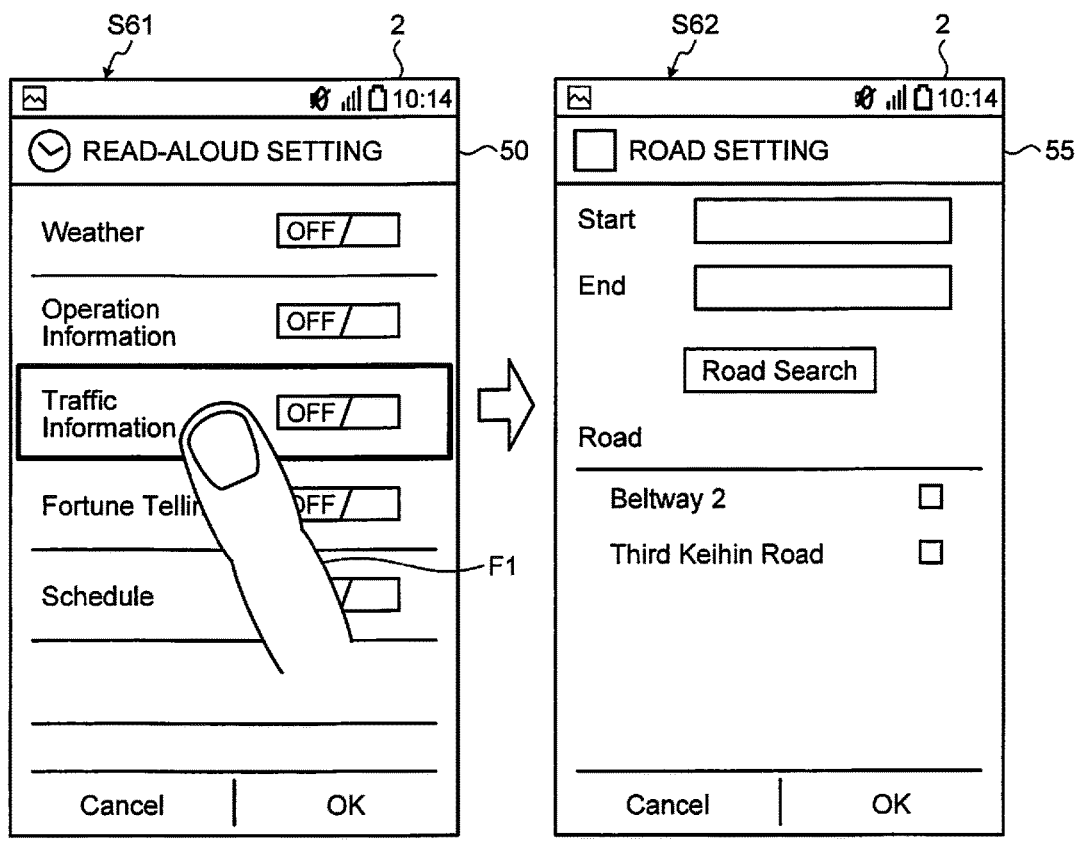
FIG. 9 is a diagram of one of examples of control to display a screen for settings of traffic information on the display.

FIG. 9 is a diagram of one of examples of control to display a screen for settings of traffic information on the display 2. The user can specify a departure point and a destination point, and set a road whose information is output with a reading voice, by operating the screen illustrated in FIG. 9.

Step S61 illustrated in FIG. 9 represents a state in which the user's finger F1 is in contact with an area indicated as "Traffic Information" on the read-aloud setting screen 50. Step S62 illustrated in FIG. 9 represents a state in which a screen 55 used to search for a road whose traffic information is output with a reading voice is displayed on the display 2. Input boxes for inputting a departure point and a destination point are provided on the screen 55. Currently set roads (e.g., Beltway 2 and Third Keihin Road) appear on the screen 55. A road search button is provided on the screen 55 in order to start a search of a road according to the departure point and the destination point input in the input boxes.

As illustrated in FIG. 9, when the touch screen 21 detects an operation of the user performed on the area indicated as "Traffic Information" provided on the read-aloud setting screen 50 (Step S61), the smartphone 1 displays the screen 55 on the display 2 (Step S62).

Figure 10:
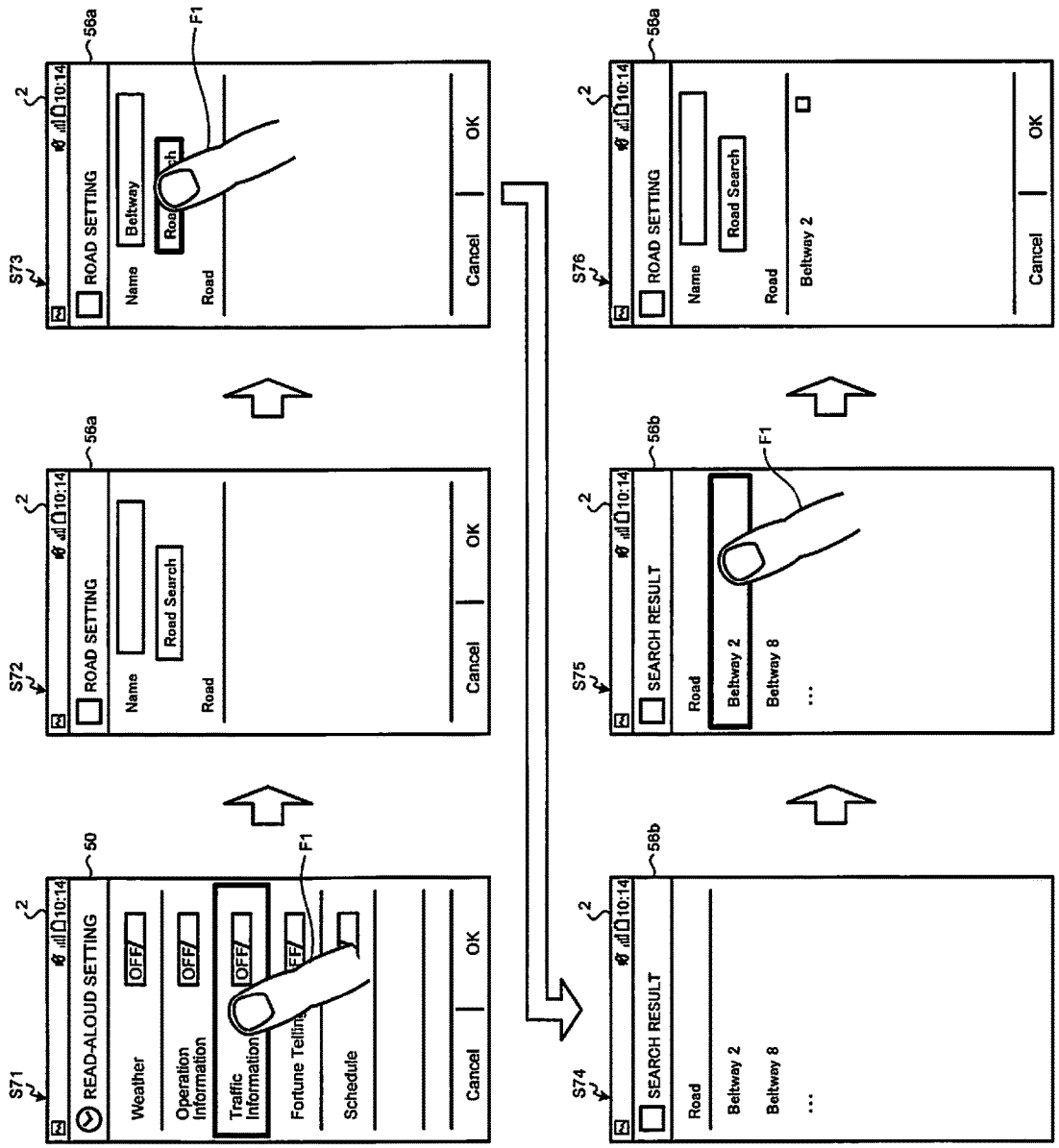
FIG. 10 is a diagram of one of examples of the control to display another screen for settings of the traffic information on the display.

FIG. 10 is a diagram of one of examples of the control to display another screen for settings of the traffic information on the display 2. The user can directly input characters included in a road name, and set the traffic information to be output with a reading voice, by operating the screen illustrated in FIG. 10.

Step S71 illustrated in FIG. 10 represents a state in which the user's finger F1 is in contact with the area indicated as "Traffic Information" on the read-aloud setting screen 50. Step S72 illustrated in FIG. 10 represents a state in which a screen 56a used to search for a road name whose traffic information is output with a reading voice is displayed. An input box for inputting characters included in the road name is provided on the screen 56a. A road search button is provided on the screen 56a in order to start a search of the road name including the characters input in the input box. Step S73 illustrated in FIG. 10 represents a state in which the characters (e.g., "Beltway") included in the road name are input in the input box provided on the screen 56a and the user's finger F1 is in contact with the road search button provided on the screen 56a. Step S74 illustrated in FIG. 10 represents a state in which a screen 56b including search results of the road name including the characters input in the input box is displayed. Step S75 illustrated in FIG. 10 represents a state in which the user's finger F1 is in contact with the area where a road name (e.g., "Beltway 2") is indicated on the screen 56b. Step S76 illustrated in FIG. 10 represents a state in which the screen 56a including the road name (e.g., "Beltway 2") whose traffic information is output with a reading voice is displayed.

As illustrated in FIG. 10, when the touch screen 21 detects an operation of the user performed on the area indicated as "Traffic Information" provided on the read-aloud setting screen 50 (Step S71), the smartphone 1 displays the screen 56a used to search for a road name whose traffic information is output with a reading voice on the display 2 (Step S72). Subsequently, when characters (e.g., Beltway) included in the road name are input in the screen 56a and an operation of the user performed on the road search button is detected by the touch screen 21 (Step S73), the smartphone 1 displays the screen 56b including search results of the road name including the characters input in the input box on the display 2 (Step S74). Then, when the operation of the user performed on the screen 56b is detected by the touch screen 21 (Step S75), the smartphone 1 displays the screen 56a, on the display 2, where the road name (e.g., Beltway 2) corresponding to the area where the contact of the user's finger F1 is detected is set as a road name whose traffic information is output with a reading voice, from among the list of the search results of the road name (Step S76).

Figure 11:
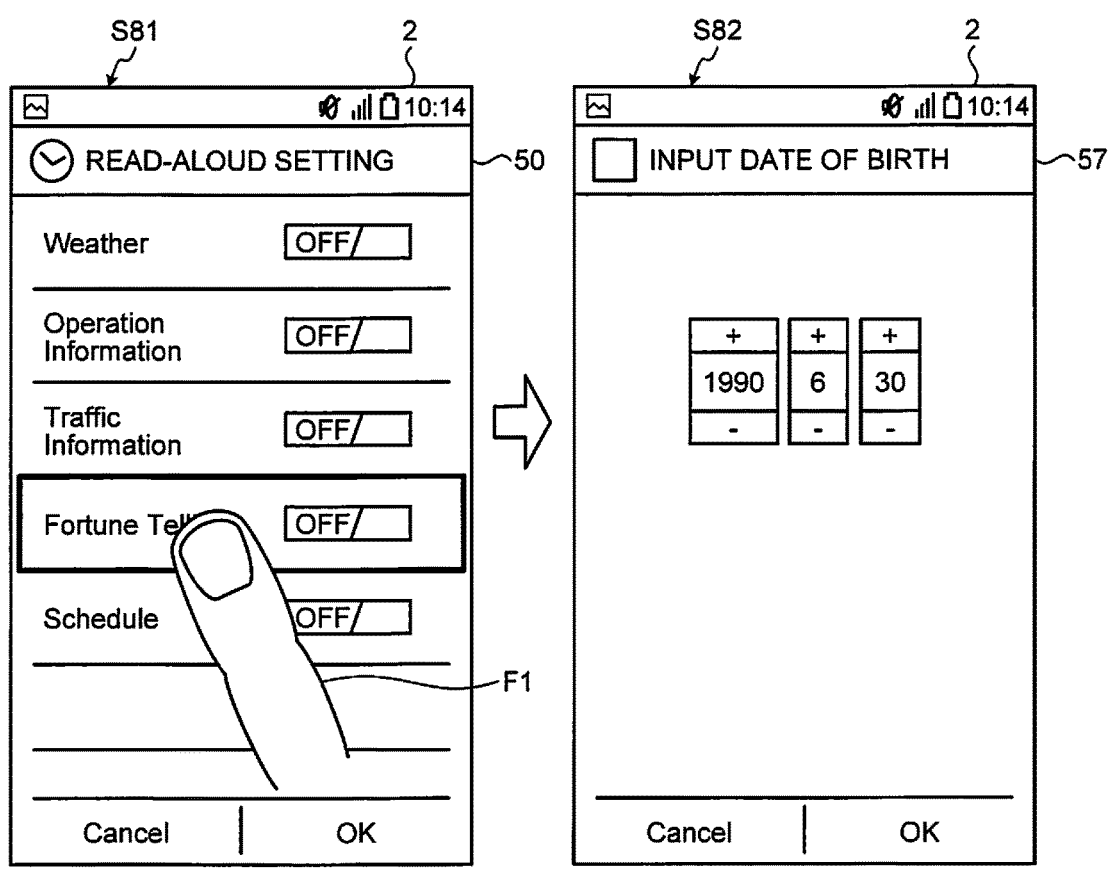
FIG. 11 is a diagram of one of examples of control to display a screen for settings of information for fortune telling on the display.

FIG. 11 is a diagram of one of examples of control to display a screen for settings of information for fortune telling on the display 2. The user can specify date of birth, and set information for fortune telling (e.g., horoscope, Chinese zodiac symbol) corresponding to the date of birth as information to be output with a reading voice, by operating the screen illustrated in FIG. 11.

Step S81 illustrated in FIG. 11 represents a state in which the user's finger F1 is in contact with an area indicated as "Fortune Telling" on the read-aloud setting screen 50. Step S82 illustrated in FIG. 11 represents a state in which a screen 57 used to set the date of birth is displayed on the display 2.

As illustrated in FIG. 11, when the touch screen 21 detects an operation of the user performed on the area indicated as "Fortune Telling" provided on the read-aloud setting screen 50 (Step S81), the smartphone 1 displays the screen 57 on the display 2 (Step S82).

Figure 12:
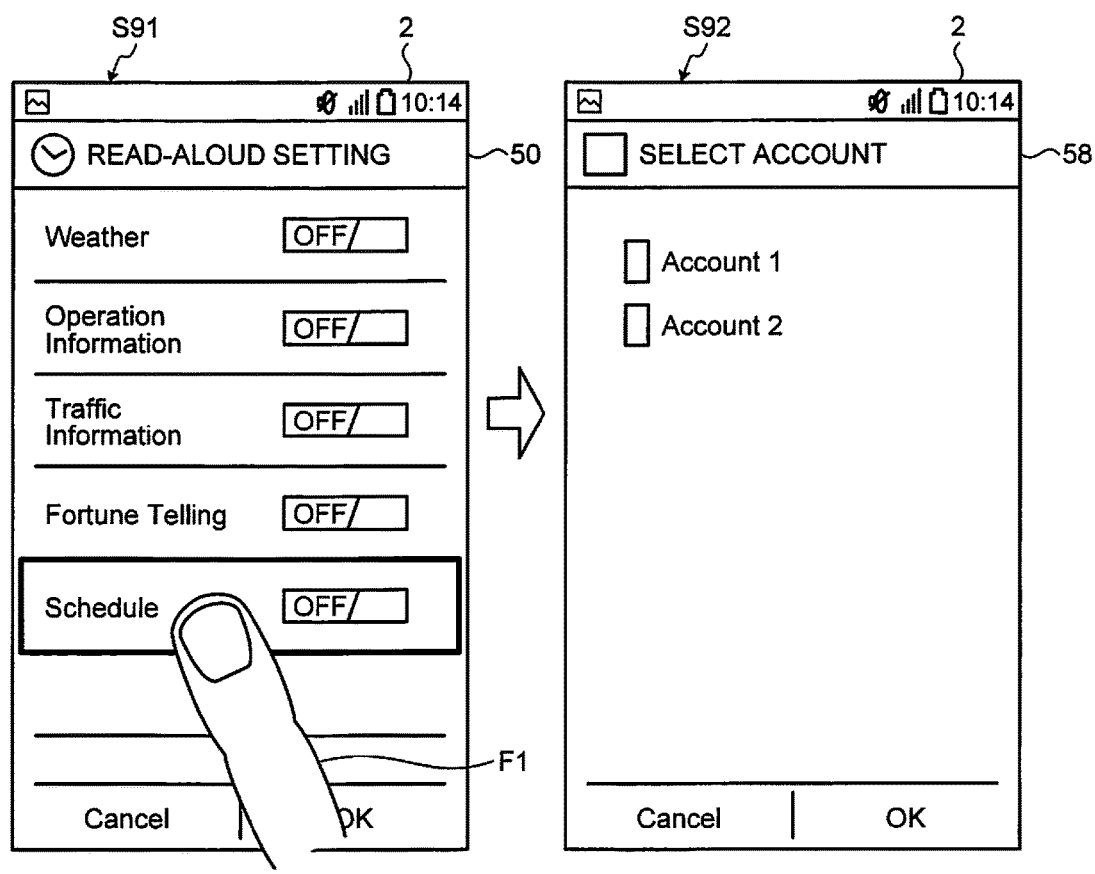
FIG. 12 is a diagram of one of examples of control to display a screen for settings of information for schedule on the display.

FIG. 12 is a diagram of one of examples of control to display a screen for settings of information for schedule on the display 2. The user can specify an account, and set the information for schedule managed by the specified account as information to be output with a reading voice, by operating the screen illustrated in FIG. 12. The account is, for example, management information uniquely assigned to the user of the smartphone 1 in the site of a company that operates service to manage the schedule.

Step S91 illustrated in FIG. 12 represents a state in which the user's finger F1 is in contact with an area indicated as "Schedule" on the read-aloud setting screen 50. Step S92 illustrated in FIG. 12 represents a state in which a screen 58 used to specify an account is displayed on the display 2.

As illustrated in FIG. 12, when the touch screen 21 detects an operation of the user performed on the area indicated as "Schedule" provided on the read-aloud setting screen 50 (Step S91), the smartphone 1 displays the screen 58 on the display 2 (Step S92).

Figure 13:
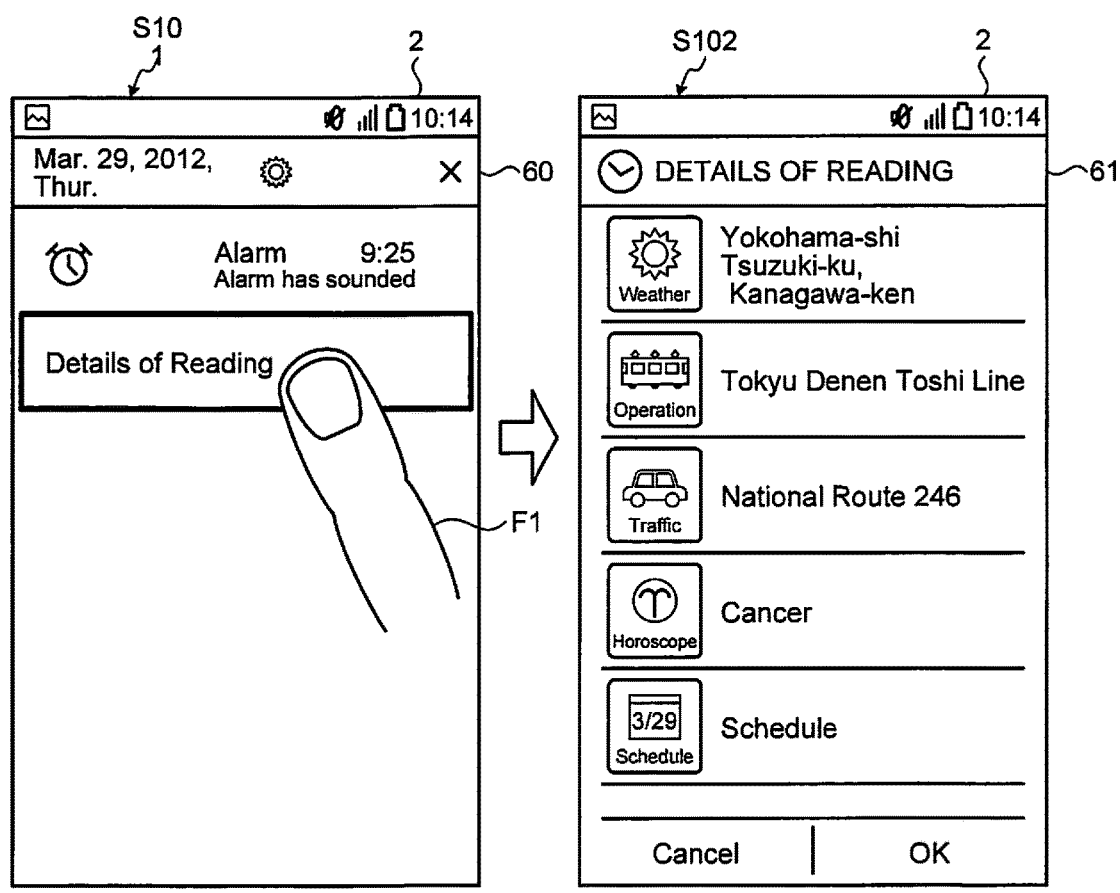
FIG. 13 is a diagram of one of examples of control to display a screen including a notification for details of a reading voice in a notification region on the display.

FIG. 13 is a diagram of one of examples of control to display a screen including a notification for details of a reading voice in a notification region on the display 2. The user can know the details of the reading voice by referring to the screen illustrated in FIG. 13. FIG. 13 depicts one of examples of using so-called a notification area as the notification region.

Step S101 illustrated in FIG. 13 represents a state in which a screen 60 with a notification region including a notification to notify the user that the alarm has sounded is displayed. Furthermore, Step S101 illustrated in FIG. 13 represents a state in which the user's finger F1 is in contact with an area indicated as "Details of Reading" provided on the screen 60 in the notification region. Step S102 illustrated in FIG. 13 represents a state in which a screen 61 including the details of the reading voice that have been output upon alarm sounding is displayed. For example, a list of information that has been output as the reading voice is displayed on the screen 61.

As illustrated in FIG. 13, when the touch screen 21 detects an operation of the user performed on the area indicated as "Details of Reading" provided on the screen 60 in the notification region (Step S101), the smartphone 1 displays the screen 61 on the display 2 (Step S102). When receiving the user's selection of an item from among the list of the information output as the reading voice, the smartphone 1 can display the detailed information of the selected item on the display 2.

Figure 14:
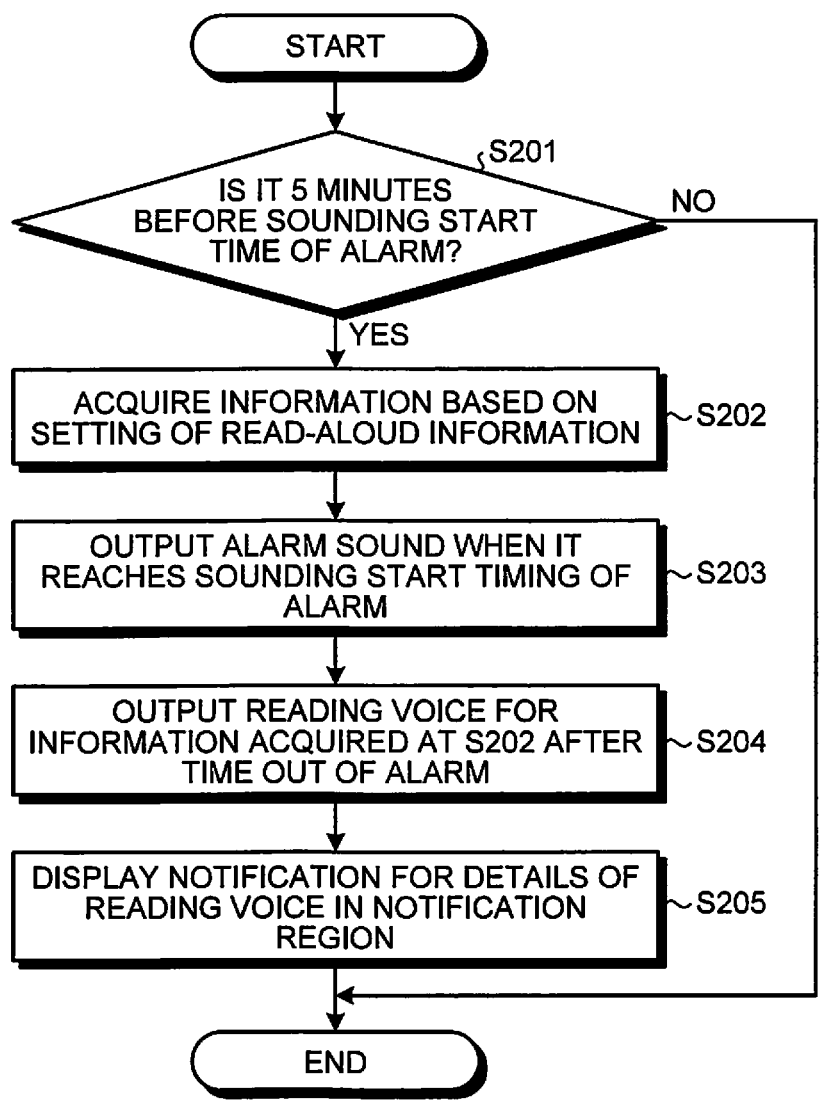
FIG. 14 is a diagram of one of examples of a processing procedure for implementing the control based on a function provided by a control program according to the first embodiment.

FIG. 14 is a diagram of one of examples of a processing procedure for implementing the control based on a function provided by the control program 9A according to the first embodiment. The processing procedure illustrated in FIG. 14 is implemented by the controller 10 executing the control program 9A. The processing procedure illustrated in FIG. 14 is repeatedly performed while the smartphone 1 operates.

As illustrated in FIG. 14, for example, at Step S201, the controller 10 determines whether it is 5 minutes before the sounding start time of the alarm. When it is not 5 minutes before the sounding start time of the alarm as a result of determination (No at Step S201), the controller 10 once terminates the processing procedure of FIG. 14, and again executes the determination at Step S201 at the next processing timing.

Meanwhile, when it is 5 minutes before the sounding start time of the alarm as a result of determination (Yes at Step S201), then at Step S202, the controller 10 acquires information based on the read-aloud settings. The controller 10 refers to the read-aloud setting data to acquire the information set in advance as information to be output with a reading voice upon sounding the alarm. For example, when the information selected in advance by the user as information to be output with a reading voice includes the weather information, the operation information of trains, the traffic information of roads, and the information of fortune telling, the controller 10 acquires respective pieces of information from the Web sites of companies that provide these pieces of information.

Subsequently, at Step S203, when it reaches the sounding start timing of the alarm, the controller 10 outputs an alarm sound from the speaker 11. Then, at Step S204, after the time out of the alarm (after the output of the alarm sound is stopped), the controller 10 acquires a reading voice for the information acquired at Step S202 from the voice reading application 9B, and outputs the reading voice from the speaker 11. Subsequently, at Step S205, the controller 10 displays a notification for the details of the reading voice in the notification region.

As explained above, in the first embodiment, the smartphone 1 acquires the information selected in advance by the user as information to be output as a reading voice upon sounding the alarm, and outputs the reading voice corresponding to the acquired information after the time out of the alarm. Consequently, according to the first embodiment, the smartphone 1 can provide the user with information as new as possible in conjunction with the sounding of the alarm.

In the first embodiment, when the alarm is sounded, the details of the information to be output as a reading voice are displayed in the notification region. Therefore, according to the first embodiment, the smartphone 1 can provide the user with the information not only by voice but also in a visually recognizable manner.

In the first embodiment, the smartphone 1 provides the function (see FIG. 4 to FIG. 12, etc) of allowing the user to select in advance the contents of the information to be output as a reading voice upon sounding the alarm. Therefore, according to the first embodiment, the smartphone 1 can provide the user with information according to the desire of the user.

In the processing procedure (FIG. 14) explained in the first embodiment, one of examples has been explained in which the smartphone 1 acquires information to be output as a reading voice 5 minutes before the sounding start of the alarm; however, "5 minutes before the sounding start of the alarm" is exemplarily described. In other words, if the smartphone 1 can acquire the information to be output as a reading voice before the alarm is timed out (the alarm sound is stopped), the information may be acquired at an arbitrary timing without limitation to the "5 minutes before". For example, the smartphone 1 can acquire the information to be output as a reading voice while sounding the alarm. The timing of acquiring the information to be output as a reading voice is desirably close to the timing of alarm sounding as much as possible.

Second Embodiment

In the first embodiment, the output of the reading voice may be controlled according to the user's operation received during the sounding of the alarm.

The function provided by the control program 9A further includes a function of determining whether or not to output the information to be output as the reading voice according to the operation received during the sounding of the alarm. For example, the control program 9A provides the function of determining that the reading voice is not output when receiving an operation of stopping the alarm or an operation of starting Snooze from the user during the sounding of the alarm. The function provided by the control program 9A includes a function of receiving an operation of stopping the alarm or an operation of starting the snooze from the user during the sounding of the alarm. For example, the control program 9A functions a screen representing that the alarm is sounding as an interface for receiving the operation of stopping the alarm or the operation of starting the snooze from the user.

The controller 10 executes the control program 9A to thereby determine whether or not to output the information to be output as a reading voice according to the operation received during the sounding of the alarm. For example, when receiving the operation of stopping the alarm or the operation of starting the snooze during the sounding of the alarm, the controller 10 determines that the reading voice is not output.

Figure 15:
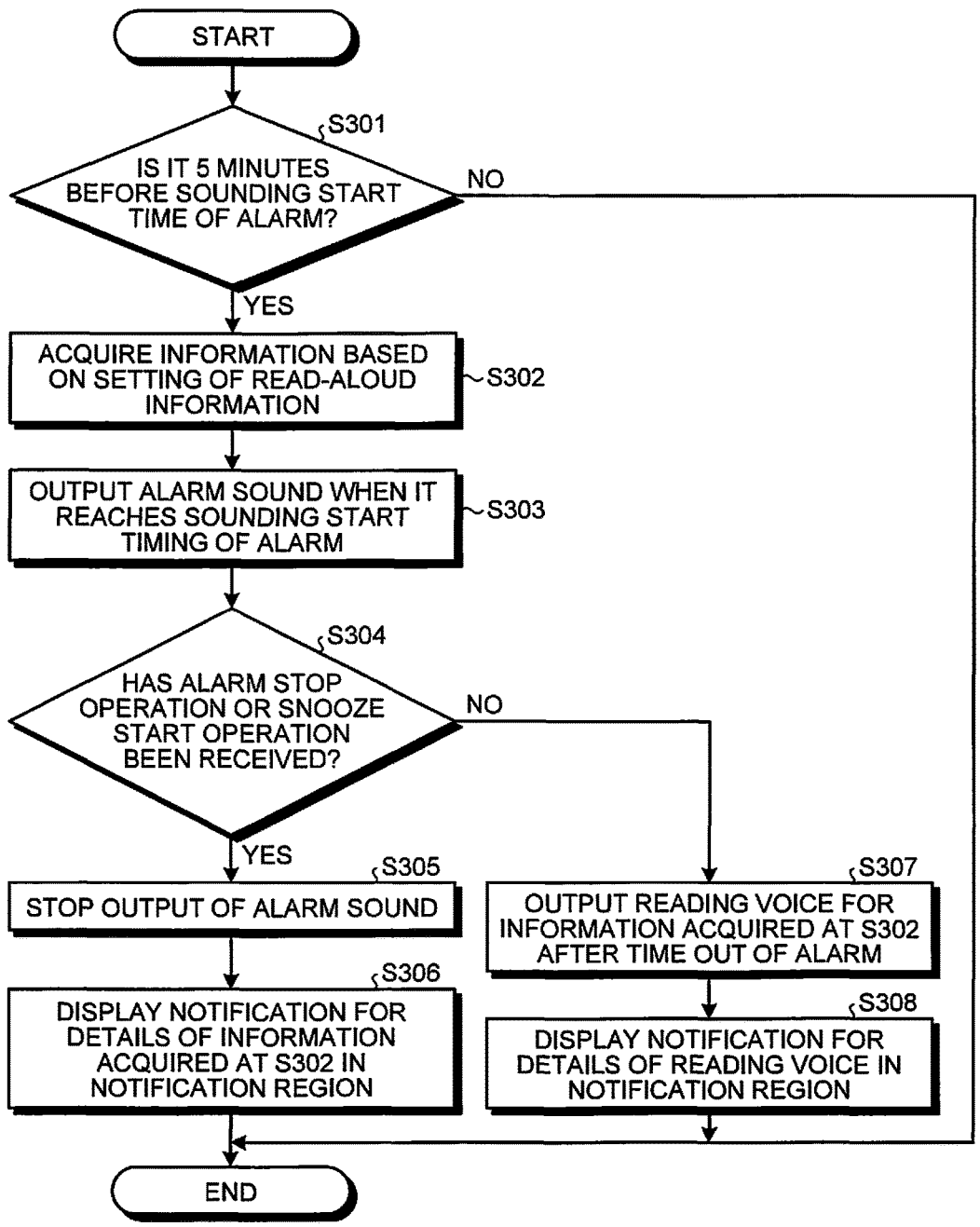
FIG. 15 is a diagram of one of examples of a processing procedure for implementing the control based on a function provided by a control program according to a second embodiment.

FIG. 15 is a diagram of one of examples of a processing procedure for implementing the control based on a function provided by a control program according to a second embodiment. The processing procedure illustrated in FIG. 15 is implemented by the controller 10 executing the control program 9A. The processing procedure illustrated in FIG. 15 is repeatedly performed while the smartphone 1 operates.

As illustrated in FIG. 15, for example, at Step S301, the controller 10 determines whether it is 5 minutes before the sounding start time of the alarm. When it is not 5 minutes before the sounding start time of the alarm as a result of determination (No at Step S301), the controller 10 once terminates the processing procedure of FIG. 15, and again executes the determination at Step S301 at the next processing timing.

Meanwhile, when it is 5 minutes before the sounding start time of the alarm as a result of determination (Yes at Step S301), then at Step S302, the controller 10 acquires information based on the read-aloud settings. The controller 10 refers to the read-aloud setting data to acquire the information set in advance as information to be output with a reading voice upon sounding the alarm. For example, when the information selected in advance by the user as information to be output with a reading voice includes the weather information, the operation information of trains, the traffic information of roads, and the information of fortune telling, the controller 10 acquires respective pieces of information from the Web sites of companies that provide these pieces of information.

Subsequently, at Step S303, when it reaches the sounding start timing of the alarm, the controller 10 outputs an alarm sound from the speaker 11. Then, at Step S304, the controller 10 determines whether the alarm stop operation or the snooze start operation has been received during the sounding of the alarm.

Figure 16:
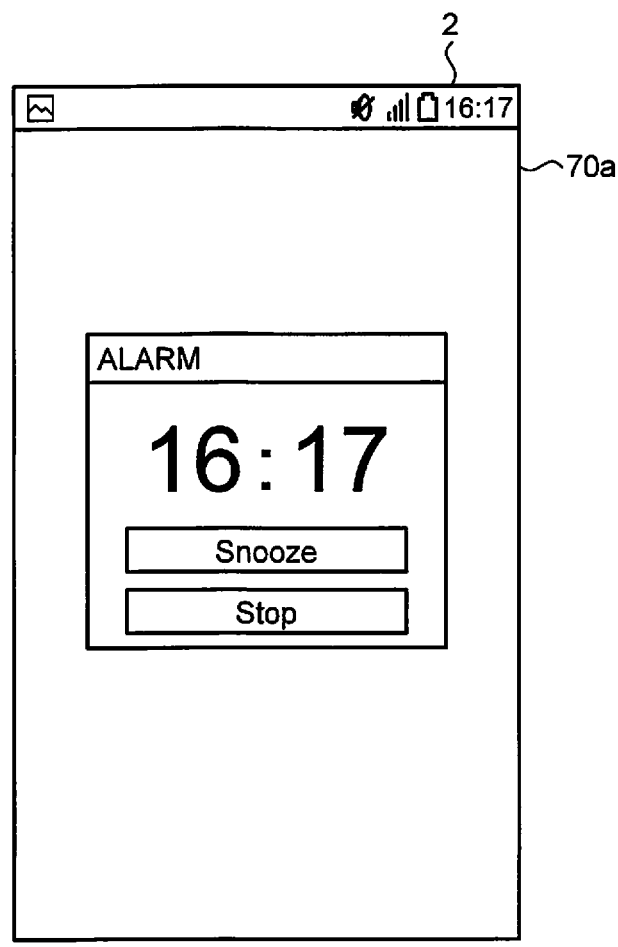
FIG. 16 is a diagram of one of examples of a screen representing that an alarm is sounding according to the second embodiment.

FIG. 16 is a diagram of one of examples of a screen representing that an alarm is sounding according to the second embodiment. As illustrated in FIG. 16, a screen 70a representing that the alarm is sounding includes an operating part indicated as "Stop" to stop the alarm and an operating part indicated as "Snooze" to start the snooze. When the touch screen 21 detects an operation performed on the operating part indicated as "Stop" or on the operating part indicated as "Snooze" on the screen 70a illustrated in FIG. 16, the controller 10 determines that the alarm stop operation or the snooze start operation has been received during the sounding of the alarm.

When the alarm stop operation or the snooze start operation has been received as a result of determination (Yes at Step S304), then at Step S305, the controller 10 stops the output of the alarm sound. Subsequently, at Step S306, the controller 10 displays a notification for the details of the information acquired at Step S302 in the notification region.

When the alarm stop operation and the snooze start operation has not been received as a result of determination at Step S304 (No at Step S304), then at Step S307, after the time out of the alarm, the controller 10 acquires a reading voice for the information acquired at Step S302 from the voice reading application 9B and outputs the reading voice from the speaker 11. Subsequently, at Step S308, the controller 10 displays a notification for the details of the reading voice in the notification region.

In the processing procedure illustrated in FIG. 15, one of examples has been explained in which the smartphone 1 does not output the reading voice when receiving the snooze start operation as well as the alarm stop operation; however, the embodiment is not limited thereto. When receiving the snooze start operation, the smartphone 1 may output the reading voice after the output of the alarm sound is stopped. Moreover, it may be configured that the smartphone 1 outputs the reading voice in each case when the alarm is repeatedly sounded due to the snooze at a predetermined cycle. In other words, the smartphone 1 may output the reading voice upon resuming the alarm. The cycle of the sounding of the alarm due to the snooze can be arbitrarily set by the user from, for example, an area indicated as "Repeat" on the alarm setting screen 40 illustrated in FIG. 2.

Third Embodiment

A third embodiment will explain another example of controlling the output of the reading voice according to the user's operation received during the sounding of the alarm.

The function provided by the control program 9A further includes a function of determining whether or not to output the information to be output as the reading voice according to the operation received during the sounding of the alarm. For example, the control program 9A provides the function of determining to output the reading voice when receiving an operation of instructing the output of the reading voice during the sounding of the alarm. The function provided by the control program 9A includes a function of receiving an operation of instructing the output of the reading voice from the user during the sounding of the alarm. For example, the control program 9A functions the screen representing that the alarm is sounding as an interface for receiving an operation of instructing the output of the reading voice from the user.

The controller 10 executes the control program 9A to thereby determine whether or not to output the information to be output as a reading voice according to the operation received during the sounding of the alarm. For example, when receiving an operation of instructing the output of a reading voice during the sounding of the alarm, the controller 10 determines to output the reading voice.

Figure 17:
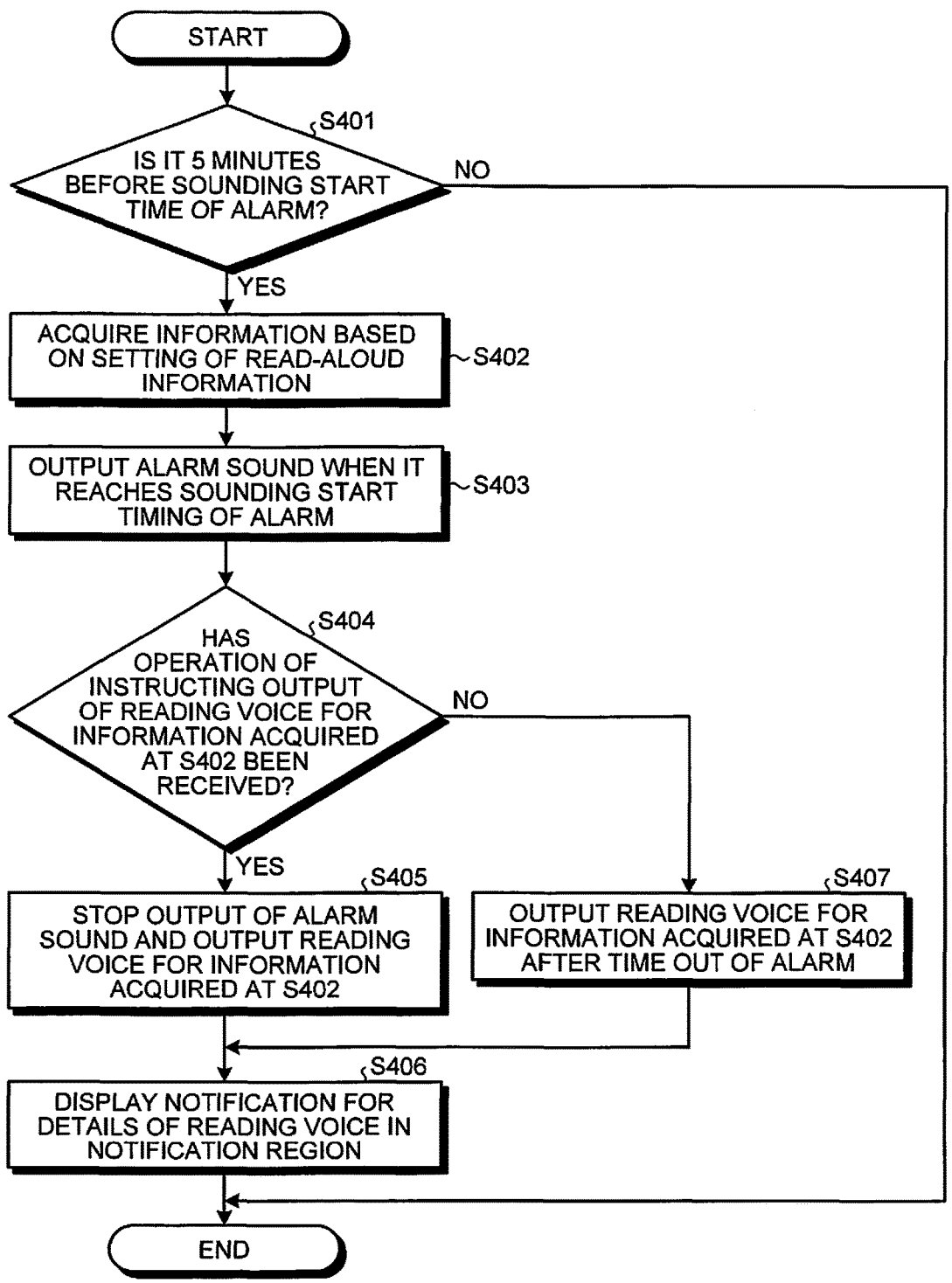
FIG. 17 is a diagram of one of examples of a processing procedure for implementing the control based on a function provided by a control program according to a third embodiment.

FIG. 17 is a diagram of one of examples of a processing procedure for implementing the control based on a function provided by a control program according to the third embodiment. The processing procedure illustrated in FIG. 17 is implemented by the controller 10 executing the control program 9A. The processing procedure illustrated in FIG. 17 is repeatedly performed while the smartphone 1 operates.

As illustrated in FIG. 17, for example, at Step S401, the controller 10 determines whether it is 5 minutes before the sounding start time of the alarm. When it is not 5 minutes before the sounding start time of the alarm as a result of determination (No at Step S401), the controller 10 once terminates the processing procedure of FIG. 17, and again executes the determination at Step S401 at the next processing timing.

Meanwhile, when it is 5 minutes before the sounding start time of the alarm as a result of determination (Yes at Step S401), then at Step S402, the controller 10 acquires information based on the read-aloud settings. The controller 10 refers to the read-aloud setting data to acquire the information set in advance as information to be output with a reading voice upon sounding the alarm. For example, when the information selected in advance by the user as information to be output with a reading voice includes the weather information, the operation information of trains, the traffic information of roads, and the information of fortune telling, the controller 10 acquires respective pieces of information from the Web sites of companies that provide these pieces of information.

Subsequently, at Step S403, when it reaches the sounding start timing of the alarm, the controller 10 outputs an alarm sound from the speaker 11. Then, at Step S404, the controller 10 determines whether an operation of instructing the output of the reading voice for the information acquired at Step S402 has been received during the sounding of the alarm.

Figure 18:
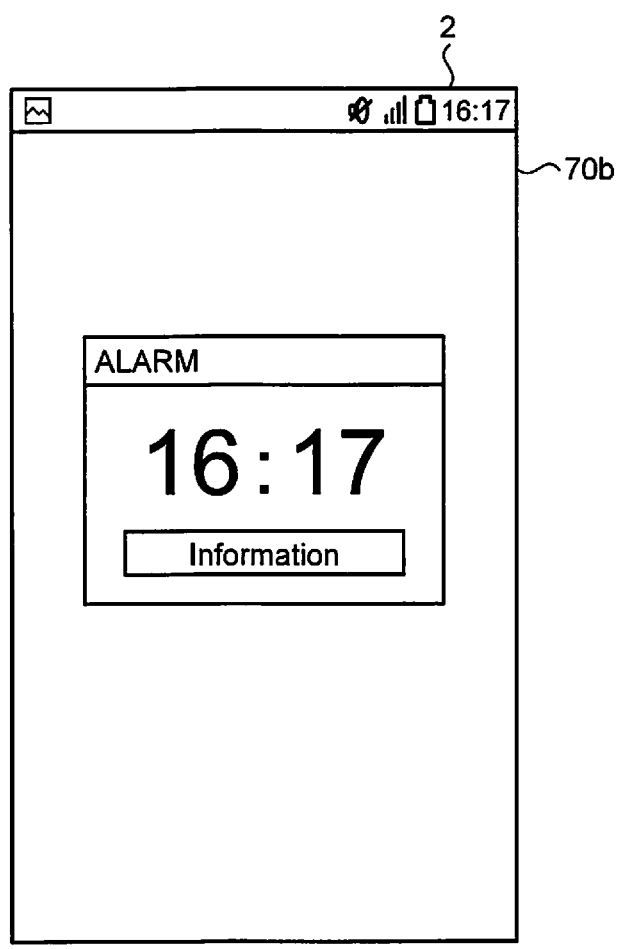
FIG. 18 is a diagram of one of examples of a screen representing that an alarm is sounding according to the third embodiment.

FIG. 18 is a diagram of one of examples of a screen representing that an alarm is sounding according to the third embodiment. As illustrated in FIG. 18, a screen 70b representing that the alarm is sounding includes an operating part indicated as "Information" to instruct the output of the reading voice corresponding to the information acquired at Step S402. When the touch screen 21 detects an operation performed on the operating part indicated as "Information" on the screen 70b illustrated in FIG. 18, the controller 10 determines that the operation of instructing the output of the reading voice corresponding to the information acquired at Step S402 has been received during the sounding of the alarm.

When the operation of instructing the output of the reading voice for the information acquired at Step S402 has been received as a result of determination (Yes at Step S404), then at Step S405, the controller 10 stops the output of the alarm sound and outputs the reading voice for the information acquired at Step S402. Subsequently, at Step S406, the controller 10 displays a notification for the details of the reading voice in the notification region.

When the operation of instructing the output of the reading voice for the information acquired at Step S402 has not been received at Step S404 (No at Step S404), then at Step S407, the controller 10 outputs the reading voice for the information acquired at Step S402 after the time out of the alarm. Subsequently, the controller 10 proceeds to the processing procedure at Step S406 described above, and displays a notification for the details of the reading voice in the notification region.

Fourth Embodiment

The processing procedure (FIG. 15) explained in the second embodiment and the processing procedure (FIG. 17) explained in the third embodiment may be integrated for execution.

Figure 19:
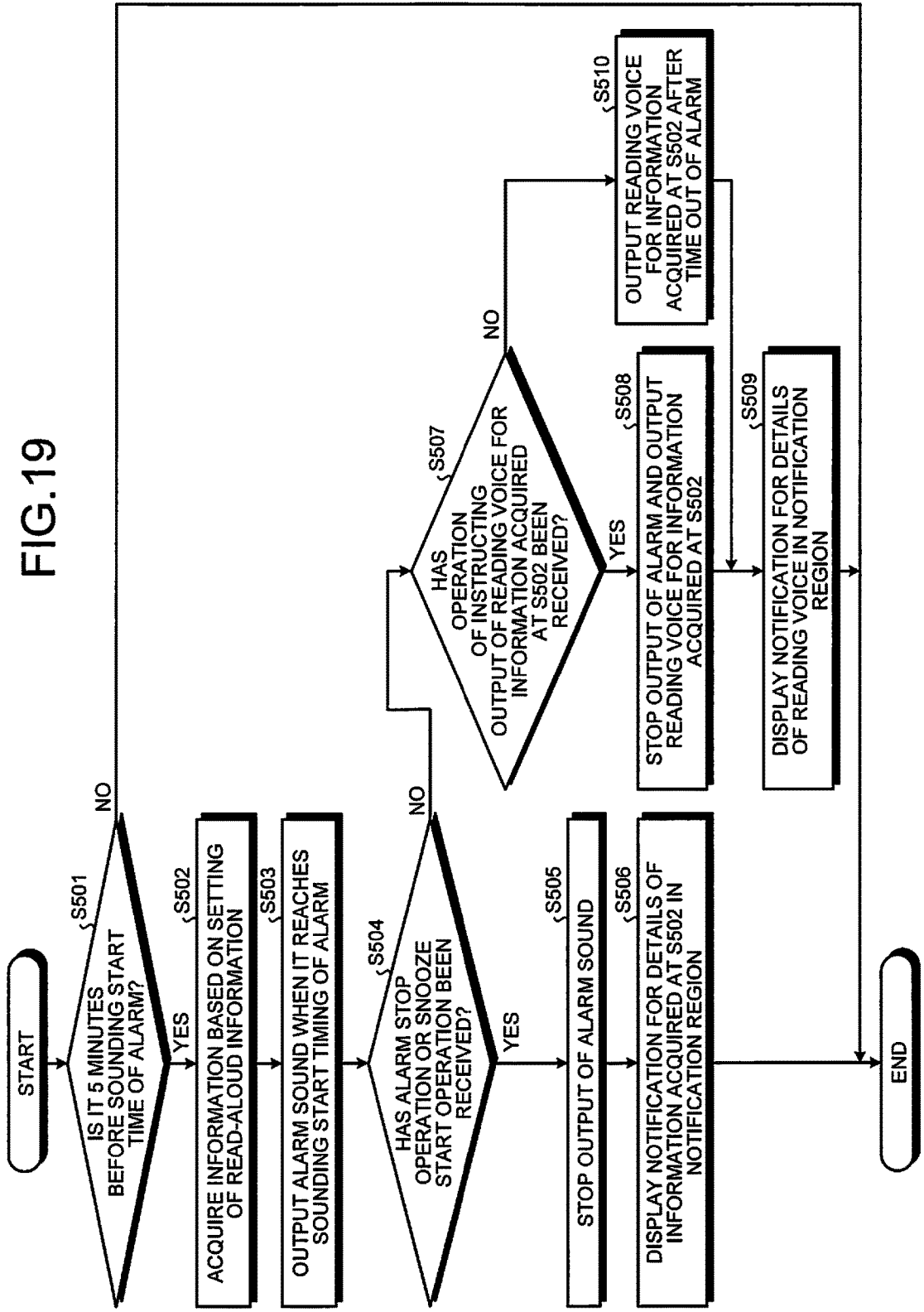
FIG. 19 is a diagram of one of examples of a processing procedure for implementing the control based on a function provided by a control program according to a fourth embodiment.

FIG. 19 is a diagram of one of examples of a processing procedure for implementing the control based on a function provided by a control program according to a fourth embodiment. The processing procedure illustrated in FIG. 19 is implemented by the controller 10 executing the control program 9A. The processing procedure illustrated in FIG. 19 is repeatedly performed while the smartphone 1 operates.

As illustrated in FIG. 19, for example, at Step S501, the controller 10 determines whether it is 5 minutes before the sounding start time of the alarm. When it is not 5 minutes before the sounding start time of the alarm as a result of determination (No at Step S501), the controller 10 once terminates the processing procedure of FIG. 19, and again executes the determination at Step S501 at the next processing timing.

Meanwhile, when it is 5 minutes before the sounding start time of the alarm as a result of determination (Yes at Step S501), then at Step S502, the controller 10 acquires information based on the read-aloud settings. The controller 10 refers to the read-aloud setting data to acquire the information set in advance as information to be output with a reading voice upon sounding the alarm. For example, when the information selected in advance by the user as information to be output with a reading voice includes the weather information, the operation information of trains, the traffic information of roads, and the information of fortune telling, the controller 10 acquires respective pieces of information from the Web sites of companies that provide these pieces of information.

Subsequently, at Step S503, when it reaches the sounding start timing of the alarm, the controller 10 outputs an alarm sound from the speaker 11. Then, at Step S504, the controller 10 determines whether the alarm stop operation or the snooze start operation has been received during the sounding of the alarm.

When the alarm stop operation or the snooze start operation has been received as a result of determination (Yes at Step S504), then at Step S505, the controller 10 stops the output of the alarm sound. Subsequently, at Step S506, the controller 10 displays a notification for the details of the information acquired at Step S502 in the notification region.

When the alarm stop operation and the snooze start operation has not been received as a result of determination at Step S504 (No at Step S504), then at Step S507, the controller 10 determines whether an operation of instructing the output of the reading voice for the information acquired at Step S502 has been received.

Figure 20:
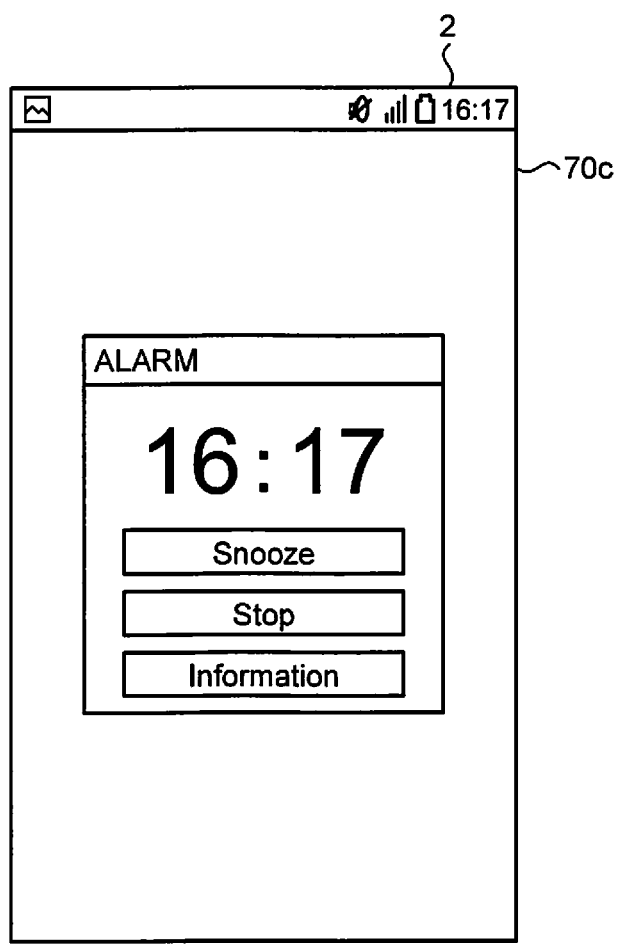
FIG. 20 is a diagram of one of examples of a screen representing that an alarm is sounding according to the fourth embodiment.

FIG. 20 is a diagram of one of examples of a screen representing that an alarm is sounding according to the fourth embodiment. As illustrated in FIG. 20, a screen 70c representing that the alarm is sounding includes an operating part indicated as "Stop" to stop the alarm, an operating part indicated as "Snooze" to start the snooze, and an operating part indicated as "Information" to instruct the output of the reading voice corresponding to the information acquired at Step S502. When the touch screen 21 detects an operation performed on the operating part indicated as "Stop" or on the operating part indicated as "Snooze" on the screen 70c illustrated in FIG. 20, then at Step S504 described above, the controller 10 determines that the alarm stop operation or the snooze start operation has been received during the sounding of the alarm. When the touch screen 21 detects an operation performed on the operating part indicated as "Information" on the screen 70c illustrated in FIG. 20, then at Step S507 described above, the controller 10 determines that the operation of instructing the output of the reading voice for the information acquired at Step S502 has been received.

When the operation of instructing the output of the reading voice for the information acquired at Step S502 has been received as a result of determination (Yes at Step S507), then at Step S508, the controller 10 stops the output of the alarm sound and outputs the reading voice for the information acquired at Step S502. Subsequently, at Step S509, the controller 10 displays a notification for the details of the reading voice in the notification region.

When the operation of instructing the output of the reading voice for the information acquired at Step S502 has not been received at Step S507 (No at Step S507), then at Step S510, the controller 10 outputs the reading voice for the information acquired at Step S502 after the time out of the alarm. Subsequently, the controller 10 proceeds to the processing procedure at Step S509 described above, and displays a notification for the details of the reading voice in the notification region.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, each of the programs illustrated in FIG. 1 may be divided into a plurality of modules. Alternatively, each of the programs illustrated in FIG. 1 may be integrated with other program.

In above embodiments, the smartphone is exampled as one of examples of the device with an alarm function; however, the device according to the appended claims is not limited to the smartphone. The device according to the appended claims may be any electronic device other than the smartphone. Examples of the electronic device include, but are not limited to, mobile phones, tablets, mobile personal computers, digital cameras, media players, electronic book readers, navigators, and gaming devices. Alternatively, the device according to the appended claims may be a stationary-type electronic device. Examples of the stationary-type electronic device include, but are not limited to, desktop personal computers and television receivers.

The invention claimed is:

1. An electronic device, comprising:
   a speaker; and
   a controller configured to set a timing of sounding an alarm in accordance with an input by a user on an alarm setting screen, acquire information selected in advance by the user and output the acquired information from the speaker as a reading voice in response to a stopping of the alarm,
   wherein the controller is configured to determine, in response to a stopping of a current sounding of the alarm, whether or not to output the acquired information from the speaker according to the user's operation that is received during the current sounding of the alarm from the speaker,
   at least one category of information including the information to be acquired is selectable by the user on a read-aloud setting screen, and
   the read-aloud setting screen is displayed from the alarm setting screen in response to detecting, on the alarm setting screen, a predetermined gesture.

2. The electronic device according to claim 1, wherein the controller is configured to output the acquired information upon resuming the alarm.

3. The electronic device according to claim 1, further comprising:
   a display, wherein
   the controller is configured to display details of the acquired information as character strings on the display.

4. The electronic device according to claim 1, wherein the controller is configured to receive, in advance from a user, a selection of information to be acquired upon sounding the alarm.

5. A control method for controlling an electronic device including a speaker, the control method comprising:
   setting a timing of sounding an alarm in accordance with an input by a user on an alarm setting screen;
   acquiring information, selected in advance by the user, in response to a stopping of the sounding of the alarm;
   outputting the acquired information from the speaker as a reading voice; and
   determining, in response to a stopping of a current sounding of the alarm, whether or not to output the acquired information from the speaker according to the user's operation that is received during the current sounding of the alarm from the speaker; wherein
   at least one category of information including the information to be acquired is selectable by the user on a read-aloud setting screen, and
   the read-aloud setting screen is displayed from the alarm setting screen by detecting, on the alarm setting screen, a predetermined gesture.

6. A non-transitory storage medium that stores a control program that causes, when executed by an electronic device including a speaker, the electronic device to execute:
   setting a timing of sounding an alarm in accordance with an input by a user on an alarm setting screen;
   acquiring information, selected in advance by the user, in response to a stopping of the sounding of the alarm;
   outputting the acquired information from the speaker as a reading voice;
   determining, in response to a stopping of a current sounding of the alarm, whether or not to output the acquired information from the speaker according to the user's operation that is received during the current sounding of the alarm from the speaker; wherein
   at least one category of information including the information to be acquired is selectable by the user on a read-aloud setting screen, and
   the read-aloud setting screen is displayed from the alarm setting screen by detecting, on the alarm setting screen, a predetermined gesture.

7. The electronic device according to claim 1, wherein the controller is configured to
   acquire the acquired information immediately before sounding the alarm, and
   output the acquired information after stopping the alarm.

8. The electronic device according to claim 1, wherein the controller is configured to
   acquire the acquired information while sounding the alarm, and
   output the acquired information after stopping the alarm.

9. The electronic device according to claim 1, wherein the controller is configured to acquire the acquired information by synchronizing data stored in the electronic device with an external server upon sounding the alarm.

10. The electronic device according to claim 1, wherein
    the controller is configured to output the acquired information from the speaker after a time out of the alarm, in a first case in which the user's operation is not received, and
    the controller is configured not to output the acquired information from the speaker, in a second case in which the user's operation is received as a first operation corresponding to stopping the alarm.

11. The electronic device according to claim 10, wherein the controller is configured to stop the alarm and output the acquired information from the speaker after stopping the current sounding of the alarm, in a third case in which, during the current sounding of the alarm, the user's operation is received and is different from the first operation.

12. The electronic device according to claim 11, wherein the controller is configured to,
    in the first case or the third case, display the acquired information on a display of the electronic device, after stopping outputting said acquired information from the speaker, and
    in the second case, display the acquired information on the display.

13. The electronic device according to claim 1, wherein the acquired information is independent and distinct from the current sounding of the alarm.

14. The electronic device according to claim 1, wherein the user's operation does not change the contents of the acquired information.

15. The electronic device according to claim 1, wherein in response to the selection of the at least one category of information, the controller is configured to display a detailed information selection screen where the information to be acquired is selectable by the user.

16. The electronic device according to claim 1, wherein the acquired information includes at least one of weather data, train operation data, traffic data, fortune telling data, and schedule data.

* * * * *